United States Patent
Oomura et al.

(10) Patent No.: US 9,527,327 B2
(45) Date of Patent: Dec. 27, 2016

(54) PROTECTIVE LAYER TRANSFER SHEET AND INTERMEDIATE TRANSFER MEDIUM

(71) Applicant: DAI NIPPON PRINTING CO., LTD., Tokyo (JP)

(72) Inventors: Junpei Oomura, Tokyo (JP); Kenzo Hayashi, Tokyo (JP); Mitsuhiro Oota, Tokyo (JP); Kano Sakamoto, Tokyo (JP); Shinya Yoda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/780,904

(22) PCT Filed: Mar. 28, 2014

(86) PCT No.: PCT/JP2014/059314
§ 371 (c)(1),
(2) Date: Sep. 28, 2015

(87) PCT Pub. No.: WO2014/157678
PCT Pub. Date: Oct. 2, 2014

(65) Prior Publication Data
US 2016/0067997 A1    Mar. 10, 2016

(30) Foreign Application Priority Data

Mar. 29, 2013 (JP) ................. 2013-075019
Mar. 29, 2013 (JP) ................. 2013-075041
(Continued)

(51) Int. Cl.
*B41M 5/382* (2006.01)
*B41M 5/42* (2006.01)
(Continued)

(52) U.S. Cl.
CPC ............... *B41M 5/42* (2013.01); *B32B 27/08* (2013.01); *B32B 27/20* (2013.01); *B32B 27/30* (2013.01);
(Continued)

(58) Field of Classification Search
CPC ..... B41M 5/382; B41M 5/38257; B41M 5/42; B41M 5/44; B41M 7/0027; B41M 2205/02; B41M 2205/06; B41M 2205/10; B41M 2205/40
(Continued)

(56) References Cited

U.S. PATENT DOCUMENTS

2005/0079341 A1   4/2005   Masuda et al.
2013/0164463 A1   6/2013   Yoda et al.

FOREIGN PATENT DOCUMENTS

| JP | 62-238791 A | 10/1987 |
| JP | 2004-351656 A | 12/2004 |
| JP | 2005-096245 A | 4/2005 |
| JP | 2007-203669 A | 8/2007 |
| JP | 2008-238525 A | 10/2008 |
| JP | 2012-051215 A | 3/2012 |

OTHER PUBLICATIONS

International Search Report mailed Jun. 24, 2014; PCT/JP2014/059314.

*Primary Examiner* — Bruce H Hess
(74) *Attorney, Agent, or Firm* — Ladas & Parry LLP

(57) ABSTRACT

The purpose is to provide a protective layer transfer sheet and an intermediate transfer medium, in which a transfer layer has excellent foil tearing property during transfer and in which sufficient durability can be imparted to the thermally transferred image.

The above problem is solved by a protective layer transfer sheet (100) in which a transfer layer (20) is provided on one surface of a substrate (1) so as to be peelable from the substrate (1), wherein the transfer layer (20) comprises a peeling layer (2) and a protective layer (3) which are layered in this order from the substrate; wherein the protective layer (3) includes an acrylic polyol resin having a glass transition temperature (Tg) of more than 80° C. or a polyester polyurethane resin having a glass transition temperature (Tg) of not less than 50° C.; and wherein the peeling layer includes at least one selected from a group consisting of polyester resins, acrylic urethane resins, and epoxy resins.

16 Claims, 1 Drawing Sheet

(30) Foreign Application Priority Data

Sep. 30, 2013 (JP) .................................. 2013-205771
Mar. 28, 2014 (JP) .................................. 2014-068591

(51) Int. Cl.
*B41M 5/44* (2006.01)
*B41M 7/00* (2006.01)
*B32B 27/08* (2006.01)
*B32B 27/30* (2006.01)
*B32B 27/40* (2006.01)
*B32B 27/20* (2006.01)
*B32B 27/36* (2006.01)
*B32B 27/38* (2006.01)
*B41M 5/41* (2006.01)
*C09D 123/00* (2006.01)

(52) U.S. Cl.
CPC .............. *B32B 27/36* (2013.01); *B32B 27/38* (2013.01); *B32B 27/40* (2013.01); *B41M 5/38257* (2013.01); *B41M 5/41* (2013.01); *B41M 5/44* (2013.01); *B41M 7/0027* (2013.01); *C09D 123/00* (2013.01); *B41M 2205/10* (2013.01); *B41M 2205/40* (2013.01)

(58) Field of Classification Search
USPC ....................................... 503/227; 428/32.51
See application file for complete search history.

PROTECTIVE LAYER TRANSFER SHEET AND INTERMEDIATE TRANSFER MEDIUM

TECHNICAL FIELD

The present invention relates to a protective layer transfer sheet and an intermediate transfer medium.

BACKGROUND ART

Sublimation transfer method has been widely used for preparing printed articles since it can provide high-quality images of excellent transparency, and high reproducibility and high gradation of neutral tints, which are equivalent to the conventional full-color photographic images. As the printed articles, digital photographs, and ID cards which are used in various fields and known as identification card, driver's license card, membership card, and the like, are known.

In the case of image forming in accordance with the sublimation transfer method, a thermal transfer sheet that has a dye layer provided on one surface of a substrate, and a transfer receiving article, for instance, thermal transfer receiving sheet that has a receiving layer provided on one surface of another substrate, is used. The dye layer of the thermal transfer sheet is superposed on the transfer receiving article, and then, they are heated by a thermal head from the back face of the thermal transfer sheet so as to transfer dyes of the dye layer onto the transfer receiving article, and thereby a printed article in which an image is formed on the transfer receiving article is obtained. According to the sublimation transfer method, since it is possible to control the transferring amount of the dye dot unit by dot unit with varying the amount of energy applied to the thermal transfer sheet, it is possible to perform a density gradation. Therefore, this method can provide a high quality image which is very vivid, and excels in the transparency, and the color reproducibility and the gradient of halftones, and which is comparable to full-color photograph image.

In recent years, on any other than the thermal transfer image-receiving sheet material to form a thermal transfer image needs to correspond to the printed product, it has been proposed that the intermediate transfer medium is provided for releasably receiving layer on a base material (for example, the Patent literature 1). According to the intermediate transfer medium, dyes of the dye layer of the thermal transfer sheet is transferred onto the receiving layer of the intermediate transfer medium to form a thermally transferred image, and then the intermediate transfer medium is heated from the back face thereof so as to transfer the receiving layer onto an arbitrary-selected transfer receiving article, it is possible to obtain a printed article where the thermally transferred image is formed an arbitrary-selected transfer receiving article.

In the printed article which is obtained by forming a thermal transfer image onto a receiving layer of the thermal transfer image-receiving sheet in accordance with the sublimation transfer system, or by forming a thermal transfer image onto a receiving layer of the intermediate transfer medium and retransferring the receiving layer onto an arbitrary-selected transfer receiving article, the receiving layer on which the thermally transferred image has been formed is located on the outermost surface of the printed matter. Although the thermal transfer image which is formed on the receiving layer in accordance with the sublimation transfer method is excellent in the formation of gradation image as mentioned above, the obtained printed article suffers with a problem of lack of durability including plasticizer resistance, abrasion resistance and solvent resistance, since the print is formed with dyes which each has a relatively low molecular weight, and they are different from the conventional printing ink which are made of pigments, and they does not have a vehicle.

Therefore, recently, a method of forming a protective layer, in which a protective layer transfer sheet having a protective layer is superposed on the receiving layer of the thermal transfer receiving sheet onto which a thermal transfer image has been formed, then the protective layer is transferred onto the receiving layer by using a thermal head or heating roll or the like, thus, the protective layer is formed on receiving layer of the thermal transfer receiving sheet onto which a thermal transfer image has been formed, has been known. It is possible to improve the durability of the image by forming such a protective layer on the image. With respect to the intermediate transfer medium, similar attempts have been made, for example, in the Patent literature 2, an intermediate transfer medium, where a peeling layer, a protective layer, and a layer functioned both as receiving layer and adhesive layer is provided on a substrate, has been proposed. According to this intermediate transfer medium, it is said that it is possible to impart durability to the thermal transfer image, since the protective layer is located on the surface of the receiving layer onto which the thermal transfer image has been formed, after the receiving layer onto which the thermal transfer image has been formed, and the protective layer are transferred on a certain substrate. Incidentally, in the protective layers which have been known to date, it has not attained to satisfy both of physical durability and chemical durability at the same time, therefore, there is a room for improving the protective layer so as to satisfy the both of durability at the same time.

PRIOR ART LITERATURE

Patent Literature

Patent Document 1: JP SH062-238791 A
Patent Document 2: JP 2004-351656 A

SUMMARY OF THE INVENTION

Problems to be Solved by the Invention

Further, in the case of using a protective layer the main purpose of which is to improve the durability, the foil tearing of the protective layer becomes poor. Thus, when protective layer of the protective layer transfer sheet is, or a receiving layer of the intermediate transfer medium on which the thermal transfer image has been formed and a protective layer are, transferred onto a transfer receiving material, blooming in the protective layer to be transferred, and/or transfer failure at the end of the transferred portion are caused. Although it is conceivable to reduce the thickness of the protective layer in order to improve the foil tearing property, however, the lowering of the layer thickness of the protective layer brings about the lowering of durability.

As an important function required for the protective layer, the foil tearing is mentioned in conjunction with the above mentioned durability. However, there is a trade-off relationship between the durability and the foil tearing. When improving the durability of the protective layer, the foil tearing of the protective layer has deteriorated. Therefore, it is impossible to satisfy both the durability and the foil tearing in one protective layer up to the present. Further, when releasability of the protective layer from the substrate is low, it might also cause a problem such that a part of the protective layer is not transferred. Thus, it is also important to improve the releasability of the protective layer from the substrate.

The present invention has been made in view of the above-mentioned circumstances, and the present invention aims principally to provide a protective layer transfer sheet and an intermediate transfer medium, each of which excels in the foil tearing on transfer, and can impart a sufficient durability to the thermally transferred image.

Means for Solving the Problems

An aspect of the present invention for solving the above-mentioned problems is a protective layer transfer sheet which comprises a substrate, and a transfer layer peelably provided on a surface of the substrate; wherein the transfer layer comprises a peeling layer and a protective layer which are layered in this order from the substrate; wherein the protective layer comprises an acrylic polyol resin having a glass transition temperature (Tg) of more than 80° C. or a polyester polyurethane resin having a glass transition temperature (Tg) of not less than 50° C.; and wherein the peeling layer comprises at least one selected from a group consisting of polyester resins, acrylic urethane resins, and epoxy resins.

Further, in the case that the protective layer comprises the acrylic polyol resin having a glass transition temperature (Tg) of more than 80° C., the acrylic polyol resin may have a weight average molecular weight (Mw) in a range of not less than 8000 and not more than 70000.

Further, in the case that the protective layer comprises the acrylic polyol resin having a glass transition temperature (Tg) of more than 80° C., the acrylic polyol resin may be a cured acrylic polyol resin in which the acrylic polyol resin having a glass transition temperature (Tg) of more than 80° C. is cured by a curing agent.

Further, in the case that the protective layer comprises the acrylic polyol resin having a glass transition temperature (Tg) of more than 80° C., the acrylic polyol resin may have a hydroxyl value in a range of not less than 10 mg KOH/g and not more than 100 mg KOH/g. In addition, the curing agent may be an isocyanate type curing agent selected from a group consisting of XDI type, HMDI type and IPDI type.

In the case that the protective layer comprises the polyester polyurethane resin having a glass transition temperature (Tg) of not less than 50° C., the protective layer may further comprise a polyvinyl alcohol resin having a saponification degree of not less than 80% and a number average molecular weight (Mn) of not less than 300 and not more than 100, in an amount of not less than 5% by weight and not more than 50% by weight, on the basis of the total solid content of the protective layer. Further, in the case that the protective layer comprises the polyester polyurethane resin having a glass transition temperature (Tg) of not less than 50° C., the protective layer may further comprise a filler having a particle diameter of not more than 200 nm, in an amount of not less than 5% by weight and not more than 30% by weight, on the basis of the total solid content of the protective layer.

Another aspect of the present invention for solving the above-mentioned problems is an intermediate transfer medium which comprises a substrate and a transfer layer which is peelably provided on a surface of the substrate; wherein the transfer layer comprises a peeling layer, a protective layer, and a receiving layer which are layered in this order from the substrate; wherein the protective layer comprises an acrylic polyol resin having a glass transition temperature (Tg) of more than 80° C. or a polyester polyurethane resin having a glass transition temperature (Tg) of not less than 50° C.; and wherein the peeling layer comprises at least one selected from a group consisting of polyester resins, acrylic urethane resins, and epoxy resins.

Still another aspect of the present invention for solving the above-mentioned problems is a protective layer transfer sheet which comprises a substrate and a protective layer which is peelably provided on a surface of the substrate; wherein the protective layer comprises an acrylic polyol resin having a glass transition temperature (Tg) of more than 80° C. or a polyester polyurethane resin having a glass transition temperature (Tg) of not less than 50° C.

In addition, in the case that the protective layer comprises the acrylic polyol resin having a glass transition temperature (Tg) of more than 80° C., the acrylic polyol resin may have a weight average molecular weight (Mw) in a range of not less than 8000 and not more than 70000.

Further, in the case that the protective layer comprises the acrylic polyol resin having a glass transition temperature (Tg) of more than 80° C., the acrylic polyol resin may be a cured acrylic polyol resin in which the acrylic polyol resin having a glass transition temperature (Tg) of more than 80° C. is cured by a curing agent.

Further, in the case that the protective layer comprises the acrylic polyol resin having a glass transition temperature (Tg) of more than 80° C., the acrylic polyol resin may have a hydroxyl value in a range of not less than 10 mg KOH/g and not more than 100 mg KOH/g. In addition, the curing agent may be an isocyanate type curing agent selected from a group consisting of XDI type, HMDI type and IPDI type.

In the case that the protective layer comprises the polyester polyurethane resin having a glass transition temperature (Tg) of not less than 50° C., the protective layer may further comprise a polyvinyl alcohol resin having a saponification degree of not less than 80% and a number average molecular weight (Mn) of not less than 300 and not more than 100, in an amount of not less than 5% by weight and not more than 50% by weight, on the basis of the total solid content of the protective layer. Further, in the case that the protective layer comprises the polyester polyurethane resin having a glass transition temperature (Tg) of not less than 50° C., the protective layer may further comprise a filler having a particle diameter of not more than 200 nm, in an amount of not less than 5% by weight and not more than 30% by weight, on the basis of the total solid content of the protective layer.

Further, another aspect of the present invention for solving the above-mentioned problems is an intermediate transfer medium which comprises a substrate, and a protective layer and an receiving layer which are layered on a surface of the substrate; wherein the protective layer is peelable from the substrate; wherein the protective layer comprises an acrylic polyol resin having a glass transition temperature (Tg) of more than 80° C. or a polyester polyurethane resin having a glass transition temperature (Tg) of not less than 50° C.

Furthermore, another aspect of the present invention for solving the above-mentioned problems is a protective layer transfer sheet which comprises a substrate and a transfer layer which is peelably provided on a surface of the substrate; wherein the transfer layer comprises a peeling layer and a protective layer which are layered in this order from the substrate; wherein the peeling layer comprises at least one selected from a group consisting of polyester resins, acrylic urethane resins, and epoxy resins, and wherein the protective layer comprises an acrylic polyol resin having a glass transition temperature (Tg) of not less than 50° C.

In addition, in the above mentioned protective layer transfer sheet, the acrylic polyol resin may have a weight average molecular weight (Mw) in a range of not less than 8000 and not more than 70000. Further, the acrylic polyol resin may be a cured acrylic polyol resin in which the acrylic polyol resin having a glass transition temperature (Tg) of not less than 50° C. is cured by a curing agent. Still further, the acrylic polyol resin may have a hydroxyl value in a range of not less than 10 mg KOH/g and not more than 100 mg KOH/g. Furthermore, the curing agent may be an isocyanate type curing agent selected from a group consisting of XDI type, HMDI type and IPDI type.

Further, still another aspect of the present invention for solving the above-mentioned problems is an intermediate transfer medium which comprises a substrate, and a transfer layer which is peelably provided on a surface of the substrate; wherein the transfer layer comprises a peeling layer, a protective layer, and a receiving layer which are layered in this order from the substrate; wherein the peeling layer comprises at least one selected from a group consisting of polyester resins, acrylic urethane resins, and epoxy resins, and wherein the protective layer comprises an acrylic polyol resin having a glass transition temperature (Tg) of not less than 50° C.

Effect of the Invention

According to the protective layer transfer sheet, and the intermediate transfer sheet of any aspect of the present invention, it is possible to impart both of the foil tearing property and the durability, which are in a trade-off relationship, to a transfer layer which include the protective layer. With respect to the protective layer transfer sheet, it excels in the foil tearing on transferring a protective layer to a receiving layer on which a thermally transferred image has been formed, and it can impart a high durability to a printed article in which the thermally transferred image has been formed. With respect to the intermediate transfer medium, it excels in the foil tearing on transferring a receiving layer, on which a thermally transferred image has been formed, and a protective layer onto a certain substrate, and it can impart a high durability to a thermally transferred image which has been formed on the receiving layer. Further, according to the protective layer transfer sheet, and the intermediate transfer sheet of an embodiment of the present invention, it is possible to impart durability which involves both of the physical durability and the chemical durability, while satisfying the above mentioned effects.

MODES FOR CARRYING OUT THE INVENTION

Protective Layer Transfer Sheet of the First Embodiment

Figure 1:
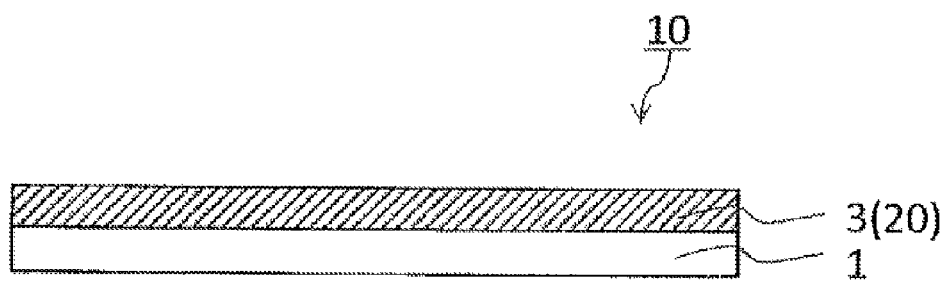
FIG. 1 is a schematic sectional view showing an example of the protective layer transfer sheet according to the present invention.
Figure 2:
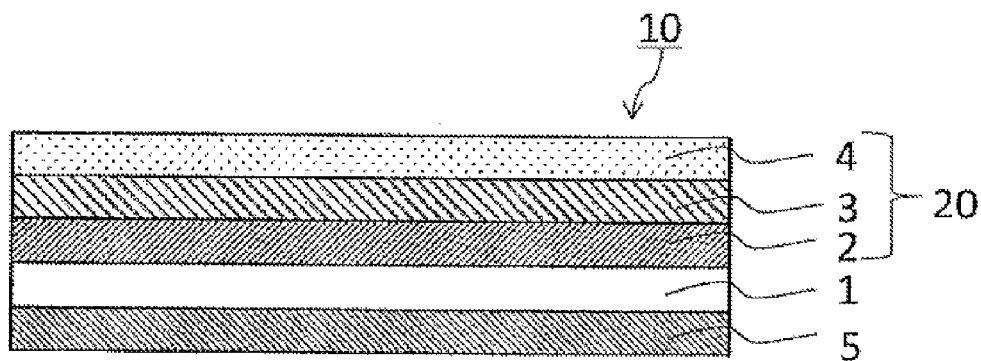
FIG. 2 is a schematic sectional view showing another example of the protective layer transfer sheet according to the present invention.

Now, the protective layer transfer sheet of the first embodiment according to the present invention will be described in detail. FIG. 1 is a schematic sectional view showing an example of the protective layer transfer sheet of the first embodiment according to the present invention. As shown in FIG. 1, the protective layer transfer sheet 10 of the first embodiment of the present invention comprises a substrate 1, and a transfer layer 20 which is peelably provided on the substrate 1. The transfer layer 20 involves at least a protective layer 3. The present invention is not limited to the embodiment shown in this figure. For example, as shown in FIG. 2, a peeling layer 2 may be provided between the substrate 1 and the protective layer 3, and an adhesive layer 4 may be provided on the protective layer 3. Further, aback face layer 5 may be provided on another surface of the substrate 1. Furthermore, any layer(s) other than those may be provided. Here, the peeling layer 2, the adhesive layer 4 and the back face layer 5 are optional layers in the protective layer transfer sheet 10 of the first embodiment of the present invention, and the peeling layer 2 and the adhesive layer 4 are optional layers which constitutes the transfer layer 20. With respect to the protective layer transfer sheet of the second embodiment of the present invention as described later, it is also possible to take the same construction. In the protective layer transfer sheet of the second embodiment of the present invention, however, the peeling layer 2 is an essential layer. Hereinafter, the components constituting the protective layer transfer sheet 10 of the first embodiment of the present invention will be described in detail.

(Substrate)

The substrate 1 is an essential component of the protective layer transfer sheet 10 according to the first embodiment of the present invention, and it is provided for the purpose of supporting the protective layer 3, or the peeling layer 2 which is optionally provided between the substrate 1 and the protective layer 3, and the back face layer 5 which is optionally provided on the other surface of the substrate 1. The material for the substrate 1 is not particularly limited, however, it is desirable to be able to resist a heat which is added upon the transfer of the protective layer 3 onto a transfer receiving article, and to have a sufficient mechanical strength for handling without a hitch. As such a material for the substrate 1, various plastic films or sheets, for instance, including, polyesters such as polyethylene terephthalate, polyarylates, polycarbonates, polyurethanes, polyimides, polyether imides, cellulose derivatives, polyethylenes, ethylene-vinyl acetate copolymers, polypropylenes, polystyrenes, polyacrylic resins, polyvinyl chlorides, polyvinylidene chlorides, polyvinyl alcohols, polyvinyl butyrals, nylons, polyether ether ketones, polysulfones, polyether sulfones, tetrafluoroethylene-perfluoroalkyl vinyl ethers, polyvinyl fluorides, tetrafluoroethylene-ethylenes, tetrafluoroethylene hexafluoropropylenes, polychlorotrifluoroethylenes, polyvinylidene fluorides, and the likes, may be enumerated.

Although the thickness of the substrate 1 can be appropriately selected depending on the kind of the material used so as to make it suitable in strength and heat resistance, the thickness is usually in the range of about 2.5 µm-about 100 µm.

(Transfer Layer)

The transfer layer 20 which includes the protective layer 3 is formed so as to be able to be peeled from the substrate 1, and is the layer which should be peeled from the substrate sheet 1 to be transferred to a transfer receiving article at the time of the thermal transfer. The transfer layer may take a single layer structure consisting of a protective layer 3, as shown in FIG. 1. Alternatively, the transfer layer may take a multi-layered structure including the protective layer 3, as shown in FIG. 2. Here, in the embodiment shown in FIG. 2, the transfer layer 20 takes a layered structure in which the peeling layer 2, the protective layer 3 and the adhesive layer 4 are layered in this order. The transfer layer 20 is not limited to the illustrated embodiments, but may be in any embodiment as long as it satisfies the condition that includes a protective layer 3. For example, in the embodiment shown in FIG. 2, it is possible to provide any layer(s) between the peeling layer 2 and the protective layer 3, and/or on the adhesive layer 4. In addition, it is also possible to impart a peeling function to the protective layer 3 and take a layered structure consisting of the peeling layer 2 and the protective layer 3

(Protective Layer)

As shown in FIG. 1 and FIG. 2, the transfer layer 20 includes a protective layer 3, as an essential layer, and the protective layer 3 is provided directly or indirectly on the substrate 1 (in the embodiment shown in FIG. 1, it is provided directly on the substrate 1, and in the embodiment shown in FIG. 2, it is provided via the peeling layer 2 indirectly on the substrate 1.).

The protect layer transfer sheet of the first embodiment is characterized in that the protective layer 3 which is contained in the transfer layer 20 includes an acrylic polyol resin having a glass transition temperature (Tg) of more than 80° C. or a polyester polyurethane resin having a glass transition temperature (Tg) of not less than 50° C. Hereinafter, the acrylic polyol resin having a glass transition temperature (Tg) of more than 80° C. may be referred to as "acrylic polyol resin (A)" occasionally, and the polyester polyurethane resin having a glass transition temperature (Tg) of not less than 50° C. may be referred to as "specific polyester polyurethane resin" occasionally. Now, the protective layer which includes the acrylic polyol resin (A) and the protective layer which includes the "specific polyester polyurethane resin" will be described respectively.

<Protective Layer of the First Embodiment>

The protective layer 3 of the first embodiment contains the acrylic polyol resin having a glass transition temperature (Tg) of more than 80° C. (the acrylic polyol resin (A)).

The acrylic polyol resin used herein means an acrylic resin having hydroxyl group(s), for instance, acrylic polyol obtained by copolymerizing one or more kinds of (meth) acrylic acid alkyl esters, such as, methyl (meth)acrylate, ethyl (meth)acrylate, butyl (meth)acrylate, 2-ethylhexyl (meth)acrylate, octyl (meth)acrylate, and one or more kinds of (meth)acrylic ester involving hydroxyl group(s) in its molecule, such as 2-hydroxyethyl (meth)acrylate, 2-hydroxybutyl (meth)acrylate, 2-hydroxy-3-phenoxypropyl (meth)acrylate, etc., and optionally, one or more kinds of other polymerizable monomers such as styrene, etc., can be enumerated. Concretely, for instance, methyl (meth)acrylate-2-hydroxyethyl (meth)acrylate copolymer, octyl (meth) acrylate-ethyl hexyl (meth)acrylate-2-hydroxyethyl (meth) acrylate copolymer, methyl (meth)acrylate-butyl (meth) acrylate-2-hydroxyethyl (meth)acrylate copolymer, and the like, can be exemplified. Here, the word "(meth)acrylate" means acrylate or methacrylate.

The glass transition temperature (Tg) of acrylic polyol resin has a close relationship with the durability and the foil tearing property which are imparted to the protective layer containing the acrylic polyol resin. When the protective layer only contains an acrylic polyol having a glass transition temperature of not more than 80° C., it cannot amply impart durability such as the heat resistance, abrasion resistance, plasticizer resistance, solvent resistance and the like (hereinafter, these are referred to simply as "durability"). In particular, in the case that the acrylic polyol having a glass transition temperature of not more than 80° C. is uncured acrylic polyol resin or a cured, but a low curing degree of acrylic polyol resin, the durability imparted to the protective layer becomes very low, and thus, it becomes impossible to impart an amply durability to a thermal transfer image onto which the protective layer has been transferred.

On the other hand, in the case that the acrylic polyol having a glass transition temperature of not more than 80° C. is a cured acrylic polyol resin having a high curing degree, it is possible to improve the durability of the protective layer which include the cured acrylic polyol resin, as compared with the durability of the uncured acrylic polyol resin or of the cured acrylic polyol resin having a low curing degree. In order to impart an ample heat resistance and an ample durability to the productive layer by using the acrylic polyol having a glass transition temperature of not more than 80° C., however, it is necessary to heighten the curing degree of the acrylic polyol resin sufficiently. But, the transferability of the protective layer decreases as the curing degree heightens.

In addition, as the curing degree of the acrylic polyol resin having a glass transition temperature of not more than 80° C. heightens, the protective layer which includes the acrylic polyol resin becomes brittle, and which is followed by a marked reduction in the foil tearing property of the protective layer on the transfer of the protective layer. Further, with respect to the durability, it is insufficient.

In addition, even if the acrylic polyol having a glass transition temperature of not more than 80° C. is allowed to be cured sufficiently, the durability such as the abrasion resistance, the plasticizer resistance, solvent resistance and the like, of the acrylic polyol are lower than the corresponding properties of a acrylic polyol having a glass transition temperature of more than 80° C.

In other words, in the case that the protective layer contains the acrylic polyol resin having a glass transition temperature (Tg) of not more than 80° C., when the acrylic polyol resin is cured with a curing agent, the requirements of the foil tearing property and the transfer property and the like cannot be attained. On the other hands, when the acrylic polyol resin having a glass transition temperature (Tg) of not more than 80° C. is uncured one, the requirement of the durability cannot be attained. Namely, in the case that the protective layer contains the acrylic polyol resin having a glass transition temperature (Tg) of not more than 80° C., without containing the acrylic polyol resin having a glass transition temperature (Tg) of more than 80° C., it is impossible to fully satisfy both of the requirements of the durability and the foil tearing property.

With respect to the protect layer transfer sheet according to an embodiment of the invention, the protective layer 3 of a first embodiment contains the acrylic polyol resin having a glass transition temperature (Tg) of more than 80° C. (the acrylic polyol resin (A)). According to the protect layer transfer sheet having the protective layer 3 of the first embodiment, it is possible to impart a sufficient durability and a sufficient foil tearing property to the protective layer 3 of the first embodiment, regardless of whether the acrylic polyol resin (A) has been cured by a curing agent or not, and regardless of the curing degree by the curing agent. Thereby, it becomes possible to impart a sufficient durability and a sufficient foil tearing property to the transfer layer 20 which includes the protective layer 3, regardless of whether the transfer layer includes optional layer(s) or not. Namely, according to the transfer layer which includes the protective layer 3 of the first embodiment of containing the acrylic polyol resin (A), it is possible to simultaneously satisfy both the requirements, i.e., the durability and the foil tearing property, which are in a trade-off relationship. Here, even if the acrylic polyol resin (A) has been not cured, but its durability is higher than that of the case that the acrylic polyol resin having a glass transition temperature (Tg) of not more than 80° C. has been completely cured with a curing agent, and thus, it is possible to impart a sufficient durability to the transfer layer which includes the protective layer 3 of the first embodiment, without deteriorating the foil tearing property.

Herein, the glass transition temperature of the acrylic polyol resin (Tg) denotes a temperature of degree Celsius (° C.) that is converted from a temperature (degree Kelvin) obtained by calculating in accordance with the Fox theoretical equation.

It is preferable that the protective layer 3 of the first embodiment includes a cured acrylic polyol resin in which the acrylic polyol resin (A) is cured by a curing agent, instead of, or in addition to, the acrylic polyol resin (A). According to the protective layer 3 of the first embodiment which includes the above mentioned cured acrylic polyol resin, it can be expected to attain a further improvement in the durability of the transfer layer 20 which include the protective layer 3. Hereinafter, the cured acrylic polyol resin in which the acrylic polyol resin (A) is cured by a curing agent is sometimes referred to as "cured acrylic polyol resin (A)".

For instance, by currying out the infrared absorption (FT-IR) analysis, it is possible to determine whether a protective layer of interest contains the acrylic polyol resin, and/or the cured acrylic polyol resin. Concretely, by the fact that absorption(s) of acrylic acid ester or methacrylic acid ester can be observed or not on the analytic observation, it can be identified that the resin contained in protective layer of interest is acrylic resin or not. Further, in the case that an isocyanate curing agent is used as the curing agent, if absorption(s) of urethane bond where an isocyanate group and a hydroxyl group were reacted with each other, absorption(s) of remaining unreacted isocyanate group can be observed, it can be identified that the reactive resin which is included in the protective layer of interest is the cured acrylic polyol resin or not. In addition, by carrying out the infrared spectroscopy (IR) measurement to determine whether additional peak(s) which is due to the bonding to the hydroxyl group is found or not, it is possible to determine whether resinous component contained in the protective layer of interest is the cured acrylic polyol resin or not. Moreover, in the case that it is specified that the protective layer of interest contains the acrylic polyol resin and/or the cured acrylic polyol resin by utilizing the above mentioned analytic methods, by separately preparing an acrylic polyol resin and/or a cured acrylic polyol which have the corresponding absorption(s) or peak(s), and subjecting these separately prepared acrylic polyol resin and/or a cured acrylic polyol to the measurement of glass transition temperature, it is possible to determine the glass transition temperature (Tg) of the acrylic polyol resin (a) and/or the cured acrylic polyol resin (A) which is contained in the protective layer of interest. Thus, it is possible to identify whether the protective layer of interest contains the acrylic polyol resin (A) and/or the cured acrylic polyol resin (B) or not. With respect to the protective layer of the protective layer transfer sheet of the second embodiment, the same identification method as described above can be applicable.

Although there is no particular limitation on the molecular weight of the acrylic polyol resin (A), when the acrylic polyol resin has a weight average molecular weight (Mw) of less than 8000, there is a tendency that the durability of the transfer layer 20 which includes the protective layer 3 of the first embodiment is decreased. Meanwhile, when the acrylic polyol resin (A) has a weight average molecular weight (Mw) of more than 70000, there is a tendency that the foil tearing on the transfer of the transfer layer 20 which includes the protective layer 3 of the first embodiment is decreased. In consideration of this viewpoint, it is preferable that the protective layer 3 of the first embodiment includes the acrylic polyol resin (A) having a weight average molecular weight (Mw) in the range of not less than 8,000 and not more than 70,000. However, this point does not limit the molecular weight of the acrylic polyol resin (A). Namely, even if the acrylic polyol resin (A) has a molecular weight out of the above mentioned preferred range, it is possible to bring good printing suitability such as durability, transferability, foil tearing property, etc., to the transfer layer 20 which includes the protective layer 3, as compared with the cases that the acrylic polyol resin having a glass transition temperature (Tg) of not more than 80° C., or a polyol resin other than the acrylic polyol resin having a glass transition temperature (Tg) of more than 80° C. is contained in the protective layer. In addition, even if the molecular weight of the acrylic polyol resin (A) is out of the above mentioned preferred range, when the acrylic polyol resin (A) having this molecular weight is allowed to cure with the curing agent as mentioned below, it is possible to impart the same durability to the transfer layer as in the case of using the acrylic polyol resin (A) having a molecular weight within the above mentioned preferred range. Incidentally, the weight average molecular weight (Mw) used herein denotes a value measured by the gel permeation chromatography (GPC) and calibrated with polystyrene standard. This point is similarly applied to a preferred molecular weight of an acrylic polyol resin (B) described later as correlated with the protective layer transfer sheet of the second embodiment, provided that the words "acrylic polyol resin (A)" is replaced with words "acrylic polyol resin (B)".

Furthermore, the hydroxyl value of the acrylic polyol resin (A) is preferably in the range of not less than 10 mg KOH/g and not more than 100 mg KOH/g. When the acrylic polyol resin (A) having a hydroxyl value within this range is used, it is possible to satisfy the foil tearing property regardless the degree of curing, and possible to improve further the durability. Incidentally, in the case that the acrylic polyol resin (A) having a hydroxyl value of more than 100 mg KOH/g is amply cured by a curing agent, there is a tendency to deteriorate the foil tearing property, since the film of the protective layer 3 of the first embodiment which contains this cured acrylic polyol resin (A) becomes brittle. Meanwhile, in the case that the hydroxyl value of the acrylic polyol resin (A) is less than 10 mg KOH/g, even if this acrylic polyol resin (A) is completely cured, the durability obtained is almost the same as that of being obtained with uncured form of this acrylic polyol resin, and thus, it cannot be expected to improve further the durability. This point is similarly applied to a preferred hydroxyl value of the acrylic polyol resin (B) described later as correlated with the protective layer transfer sheet of the second embodiment, provided that the words "acrylic polyol resin (A)" is replaced with words "acrylic polyol resin (B)".

Herein, the term "hydroxyl value" of the acrylic polyol resin means mg of potassium hydroxide required to acetylate the hydroxyl groups contained in 1 g of the acrylic polyol resin. The hydroxyl value can be determined by preparing an acrylic polyol resin pyridine solution containing acetic anhydride, acetylating the hydroxyl groups, hydrolyzing an excess of acetylation reagent by water, and subjecting obtained acetic acid to a titration with potassium hydroxide.

As the curing agent for obtaining the above mentioned cured acrylic polyol resin (A), isocyanate curing agents, and metal chelating agents such as titanium chelating agents, zirconium chelate agents, aluminum chelating agents, etc. are preferable. The isocyanate curing agent can cross-link molecules of the acrylic polyol resin having hydroxyl groups by utilizing their owned hydroxyl groups. As the isocyanate curing agent, a polyisocyanate resin can be preferably used. Although various types are known in the art as the polyisocyanate resin, it is preferable to use an adduct of aromatic isocyanate. As the aromatic polyisocyanate, for instance, 2,4-toluene diisocyanate, 2,6-toluene diisocyanate, or a mixture of 2,4-toluene diisocyanate and 2,6-toluene diisocyanatehexamethylene diisocyanate, 1,5-naphtalene diisocyanate, tolidine diisocyanate, p-phenylene diisocyanate, trans-cyclohexane, 1,4-diisocyanate, xylylene diisocyanate, triphenyl methane triisocyanate, and tris(isocyanate phenyl) thiophosphate may be enumerated. Among them, 2,4-toluene diisocyanate, 2,6-toluene diisocyanate, or a mixture of 2,4-toluene diisocyanate and 2,6-toluene diisocyanate are particularly preferable. With respect to the curing agent for obtaining cured acrylic polyol resin (B) mentioned below as being correlated with the protective layer transfer sheet of the second embodiment, the same compounds as described above can be exemplified.

The isocyanate-based curing agent is preferable to be one selected form the group consisting of XDI types, HMDI types and IPDI types. Using one of these isocyanate-based curing agents for curing the resin having a hydroxyl group, it is possible to prevent the protective layer 3 of the first embodiment which includes the cured acrylic polyol resin (A) from yellowing. Incidentally, when the acrylic polyol resin (A) is cured by an isocyanate-based curing agent other than the isocyanate-based curing agent selected from these groups, for example, TDI type, or MDI type isocyanate-based curing agent, the protective layer 3 of the first embodiment which includes the cured acrylic polyol resin (A) is forced to become yellowing, and, in some cases, the appearance of the printed articles in which the protective layer 3 has been transferred may deteriorate.

As described above, the acrylic polyol resin (A) can impart an adequate durability and an adequate foil tearing property to the protective layer 3 of the first embodiment which includes the acrylic polyol resin, even in its uncured form. Further, when the cured acrylic polyol resin (A) is contained in the protective layer 3 of the first embodiment, a further improvement in the durability can be attained. In the case of this cured acrylic polyol resin (A), even when the curing degree is still low, it is possible to impart a particularly excellent durability to the transfer layer 20 which includes the protective layer 3 of the first embodiment. Herein, depending upon the hydroxyl value of the acrylic polyol resin (A), there is a fear that the protective layer 3 of the first embodiment may become brittle with the progress of curing of the acrylic polyol resin (A), and thus the foil tearing property of the transfer layer 20 may deteriorate. Therefore, in the case that the acrylic polyol resin (A) is cured by the curing agent, it is preferable to adjust the degree of curing not so as to affect the foil tearing property of the protective layer 3 of the first embodiment.

Concretely, in the first embodiment, it is preferable that the protective layer 3 contains a cured acrylic polyol resin which is cured so that the molar equivalent ratio (—NCO/—OH) between the isocyanate group owned by the isocyanate type curing agent as the curing agent and hydroxyl group owned by the acrylic polyol resin (A) lies within the range of not more than 3.0, preferably, not more than 2.0, and more preferably, not more than 0.5. When the protective layer 3 of the first embodiment is designed so as to contain a cured acrylic polyol resin (A) which is cured with having a molar equivalent ratio (—NCO/—OH) of not more than 3.0, it is possible to further improve the foil tearing property of the protective layer 3 of the first embodiment. Incidentally, if the hydroxyl value is within the above mentioned preferred range, it is possible to provide a good foil tearing property of the protective layer 3 of the first embodiment, regardless the degree of the curing of the acrylic polyol resin (A). Particularly, from the viewpoint that further improvements in the durability of the protective layer 3 of the first embodiment can be attained, in addition to the improvement in the foil tearing property, it is desirable that the protective layer 3 of the first embodiment contains the cured acrylic polyol resin (A) which is cured so that the molar equivalent ratio (—NCO/—OH) between the isocyanate group owned by the isocyanate type curing agent and hydroxyl group owned by the acrylic polyol resin lies within the range of not less than 0.2 and not more than 3.0, preferably, the range of not less than 0.2 and not more than 2.0, and more preferably, the range of not less than 0.2 and not more than 0.5. With respect to a preferred molar equivalent ratio (—NCO/—OH) between the isocyanate group owned by the isocyanate type curing agent as the curing agent and hydroxyl group owned by the acrylic polyol resin (B) described later as being correlated with the protective layer of the second embodiment, the above description can be similarly applied, provided that the words "acrylic polyol resin (A)" is replaced with words "acrylic polyol resin (B)".

With respect to the content of the acrylic polyol resin (A) and/or the cured acrylic polyol resin (A) on the basis of the total solid content of the protective layer 3 of the first embodiment, there is no particular limitation, and it may be varied appropriately in accordance with the content of other optional component(s), or the like. Incidentally, when the content of the acrylic polyol resin (A) and/or the cured acrylic polyol resin (A) is less than 30% by weight, on the basis of the total solid content of the protective layer 3 of the first embodiment, there may be some cases where the durability cannot be sufficiently satisfied, and further, depending on the kind of other optionally added component (s), there may be some cases where the foil tearing property is reduced. In consideration of this point, it is preferable that the acrylic polyol resin (A) and/or the cured acrylic polyol resin (A) are contained in a ratio of not less than 30% by weight, more preferably, not less than 40% by weight, on the basis of the total solid content of the protective layer 3 of the first embodiment. Here, there is no particular limitation on the upper limit of the content, and it is 100% by weight.

The protective layer 3 of the first embodiment may contain singly either the acrylic polyol resin (A) or the cured acrylic polyol resin (A), or may contain both of them. Further, the protective layer 3 of the first embodiment may contain two or more kinds of the acrylic polyol resins which are mutually different in the hydroxyl value, the weight average molecular weight, or the like. In such a case, it is preferable that the total weight of these acrylic polyol resins is within the above mentioned preferred range, on the basis of the total solid content of the protective layer 3 of the first embodiment.

(Other Optional Components)

The protective layer 3 of the first embodiment may contain other optional ingredient (s) in addition to the above mentioned acrylic polyol resin (A) having a glass transition temperature (Tg) of more than 80° C. For example, in the embodiment shown in FIG. 1, release property from the substrate 1, and adhesiveness to the transfer receiving article is required on the protective layer 3. Thus, in this embodiment, it is preferable that the protective layer 3 contains a component having release property and a component having adhesive property. Further, in the embodiment shown in FIG. 1, when transferring the protective layer 3 by using the protective layer transfer sheet 10, the protective layer 3 is located on the outermost surface of the transfer receiving article. Thus, it is preferable that the protective layer 3 contains a component having abrasion resistance (it is also referred to as slipping property.). Here, it is also possible to take corresponding measures on the transfer receiving article's side so as to satisfy the adhesive property to the protective layer 3, for example, to provide an adhesive layer on the transfer receiving article. In such a case, it is not always necessary to include the component having abrasion resistance in the protective layer 3. Furthermore, as described later, the roles that are required for the protective layer 3 in the embodiment shown in FIG. 1 can also be supplemented by additional layer (s) which is included in the transfer layer 20 as shown in FIG. 2. For example, when a peeling layer 2, which can meet the demand for the release property and the abrasion resistance, is provided between the substrate 1 and the protective layer 3 of the first embodiment, and also an adhesive layer 4, which can meet the demand for the adhesiveness to the transfer receiving article, is provided on the protective layer 3 of the first embodiment, it is not always necessary to include the component having release property from the substrate, the component having adhesive property to the transfer receiving article, and the component having abrasion property in the protective layer 3 of the first embodiment. This point is similarly applied to the protective layer of the second embodiment described later, provided that the words "the protective layer of the first embodiment" is replaced with words "the protective layer of the second embodiment", and the words "the acrylic polyol resin (A)" with words "specific polyester polyurethane resin".

Further, with respect to the embodiment shown in FIG. 2, it is possible to include the component having release property and the component having abrasion property in the protective layer 3, instead of providing the peeling layer 2. In such a case, without including the component having an adhesive property in the protective layer 3 of the first embodiment, it is possible to satisfactorily transfer the protective layer 3 of the first embodiment onto the transfer receiving material. Further, with respect to the embodiment shown in FIG. 2, it is possible to include the component having adhesive property against the transfer receiving article in the protective layer 3, instead of providing the adhesive layer 4. In such a case, without including the component having release property and the component having abrasion property in the protective layer 3, it is possible to impart the durability and the abrasion property to the printed article on which the protective layer 3 of the first embodiment has been transferred. This point is similarly applied to the protective layer of the second embodiment described later, provided that the words "the protective layer of the first embodiment" is replaced with words "the protective layer of the second embodiment".

Here, it is necessary for the other optional component (s) to be contained within a range not to impair the foil tearing property and the durability, which are brought by the acrylic polyol resin (A). Concretely, it is preferable that the content of the other optional component(s) is in the range of not more than 70% by weight, on the basis of the total solid content of the protective layer 3 of the first embodiment. The following, it will be explained about the optional components. This point is similarly applied to the protective layer of the second embodiment described later, provided that the words "the protective layer of the first embodiment" is replaced with words "the protective layer of the second embodiment".

"Component Having Abrasion Resistance"

As the component having abrasion resistance, for example, methacrylic acid ester copolymers, vinyl chloride—vinyl acetate copolymers, polyester resins, polycarbonate resins, acrylic resins, ultraviolet absorbing resins, epoxy resins, polystyrene resins, polyurethane resins, acrylic urethane resins, and silicone-modified forms of these resins, mixtures of any combination of these resins, ionizing radiation-curable resins, ultraviolet absorbing resins, and the like may be enumerated. Among them, the ultraviolet absorbing resin may be suitably used in terms of particularly excellent in abrasion resistance.

As the ultraviolet ray absorbing resin, for instance, a resin which is prepared by reacting and linking a reactive ultraviolet ray absorbing agent to a thermoplastic resin or the ionizing radiation—curable resin mentioned above can be used. More concretely, those which prepared by introducing a reactive group such as an addition-polymerizable double bond (for instance, vinyl group, acryloyl group, methacryloyl group, etc.), alcoholic hydroxyl group, amino group, carboxyl group, epoxy group, isocyanate group, etc., into a non-reactive organic ultraviolet absorbing agent known in the art such as salicylate series, benzophenon series, benzotriazole series, substituted acrylonitrile series, nikkel-chelate series, hindered amine series, etc., can be exemplified.

"Component Having Release Property from the Substrate"

As the component which is excellent in release property from the substrate 1, for example, waxes such as polyethylene waxes and silicone waxes, silicone resins, silicone modified resins, fluorine-contained resins, fluorine-modified resins, polyvinyl alcohol, acrylic resins, thermally crosslinkable epoxy-amino resins and thermally-crosslinkable alkyd-amino resins, etc., can be exemplified.

"Component Having Adhesiveness to the Transfer Receiving Article"

As the component having adhesiveness to the transfer receiving article, for example, any conventionally known adhesive agents such as those having as the main ingredient one or more of acrylic resins, vinyl resins, polyester resins, urethane resins, polyamide resins, epoxy resins, rubber resins, ionomer resins, etc., can be used broadly.

"Other Optional Ingredients"

Further, the protective layer 3 of the first embodiment may also contain other optional components, in addition to the optional components as exemplified above. As the other optional components, for example, known ultraviolet absorbents such as benzophenone-based, benzotriazole-based, benzoate-based, triazine-based, titanium oxide, zinc oxide, etc.; light stabilizers such as hindered amine-type, Ni chelate-type, etc.; antioxidants such as sulfur type, phosphorus type, lactone type; can be enumerated. These optional components may be used alone, or may be used in combination of two or more.

Further, for the purpose of further improving the abrasion resistance of the protective layer 3 of the first embodiment, the protective layer 3 of the first embodiment may contain a lubricant. As the lubricant, for example, silicones such as modified silicone oil, silicone-modified resin; metal soaps such as zinc stearate, zinc stearyl phosphate, calcium stearate, magnesium stearate; fatty acid amides; polyethylene waxes, carnauba waxes, paraffins and the like can be exemplified. This point is also applicable to the protective layer of the second embodiment described later.

There is no particular limitation on the method for forming the protective layer 3 of the first embodiment, and for instance, the protective layer 3 can be formed by preparing a coating liquid for the protective layer where the acrylic polyol resin (A) and/or the cured acrylic polyol resin (A), and optionally, any component as necessary, are dispersed or dissolved in an appropriate solvent, coating thus prepared coating liquid for protective layer on the substrate 1, or on a layer which has been optionally provided on the substrate 1, in accordance with a known coating procedure such as the gravure printing method, the screen printing method, the reverse roll coating printing method using a gravure plate, or the like, and then drying the coated solution. There is no particular limitation about the thickness of the protective layer 3 of the first embodiment, and the thickness can be appropriately set within the range capable of imparting sufficient durability due to the acrylic polyol resin (A) and bringing the foil tearing property and so on into good conditions. It is preferable that the thickness of the protective layer 3 is in the range of not less than 0.5 μm and not more than 10 μm. These points are also applicable to the to the protective layer of the second embodiment described later, provided that the words "the protective layer of the first embodiment" is replaced with words "the protective layer of the second embodiment", and the words "the acrylic polyol resin (A) and/or the cured acrylic polyol resin (A)" with words "specific polyester polyurethane resin".

<Protective Layer of the Second Embodiment>

The protective layer 3 of the second embodiment includes polyester polyurethane having a glass transition temperature (Tg) of not less than 50° C.

Herein, the glass transition temperature (Tg) of polyester polyurethane resin denotes the temperature when the loss tangent (Tan δ) in dynamic viscoelasticity measurement takes the maximum value. The dynamic viscoelasticity measurement is carried out by using ARES (Advanced Rheometric Expansion System, manufactured by Rheometric) as a measuring instrument, under measuring conditions of parallel plate 10 mm in diameter, distortion: 1%, amplitude (frequency): 1 Hz, temperature rising rate: 2° C./min, and rising the measurement temperature of the resin to be tested from 30° C. to 200° C. In general, the storage elastic modulus G' is caused in the elastic ingredient by coil's vibration in macromolecule, or formation of structures such as aggregate structure, and the loss modulus G" is viscous ingredient, and it is equivalent to static shear stress. The loss tangent tan δ is obtained as G"/G (a ratio of the storage elastic modulus G' to the loss modulus G"), and it can be a measure of how much energy is absorbed upon a deformation of the material.

According to the protective layer 3 of the second embodiment which includes the "specific polyester polyurethane resin", it is possible to concurrently impart both of the physical durability and the chemical durability to the protective layer 3. Further, it is possible to satisfy the foil tearing property on the transfer of the transfer layer 20 including the protective layer. Thereby it becomes possible to impart a sufficient durability and a sufficient foil tearing property to the transfer layer 20 which includes the protective layer 3 of the second embodiment, irrespective of whether the transfer layer 20 contains any optional layer or not. Incidentally, although various studies of the binder resins for improving the physical durability and the chemical durability have been made, it is difficult to satisfy both of the physical durability and the chemical durability, concurrently, from the from the viewpoint of the physical properties of the binder resin and the viewpoint of the composition. For example, the physical property of a protective layer which contains both a binder resin having excellent physical durability and another binder resin having excellent chemical durability would become lower than that of a protective layer which contains only the binder resin having excellent physical durability. This is because the content of the binder resin having excellent physical durability is decreased as the content of the binder resin having excellent chemical durability is increased. Ditto for the chemical durability. Further, even when the binder resin having excellent physical durability is added to the protective layer by being focused on the physical durability, it is difficult to satisfactorily satisfy the foil tearing property that is in a trade-off relationship with the physical durability.

When the protective layer contains a polyester polyurethane resin having a glass transition temperature (Tg) of less than 50° C. instead of the "specific polyester polyurethane resin", it is impossible to satisfy both of the physical durability and the chemical durability concurrently. Further, when the protective layer contains another polyurethane resin, such as polyether polyurethane resin, polycarbonate polyurethane resin and the like, which is different from the polyester polyurethane resin, or a resin other than the polyurethane resin, instead of the "specific polyester polyurethane resin", even if the glass transition temperature (Tg) of these resin is not less than 50° C., it is impossible to satisfy both of the physical durability and the chemical durability concurrently.

The "specific polyester polyurethane resin" can be prepared by using a polyester polyol and an isocyanate compound. The polyester polyol is defined as a polymer which has at least two of ester bindings and at least two hydroxyl groups, and for instance, a condensate of a polyhydric alcohol and a polybasic carboxylic acid, a condensate of a hydroxy carboxylic acid and a polyhydric alcohol and a product obtained by ring-opening of cyclic lactone, etc., may be enumerated. With respect to the isocyanate compound to be used in the preparation of the "specific polyester polyurethane resin", there is no particular limitation, but it is preferable to use an adduct of aromatic isocyanate. As the aromatic polyisocyanate, those as described above in the explanation of the protective layer 3 of the first embodiment can be used by selecting appropriately, and thus, the detailed description thereof is omitted here.

For instance, by currying out the infrared spectroscopy (IR) measurement, it is possible to determine whether a protective layer of interest in the protective layer transfer sheet contains the "specific polyester polyurethane resin" or not. More concretely, by the fact that peak(s) of urethane bond and peak(s) of ester group can be observed or not on the analytic observation, it can be identified that the resin which is included in the protective layer of interest is a polyester polyurethane resin or not. Moreover, in the case that it is specified that the protective layer of interest contains the polyester polyurethane resin, by separately preparing a polyester polyurethane resin which has the corresponding peak(s), and subjecting this separately prepared polyester polyurethane resin to the measurement of glass transition temperature, it is possible to determine the glass transition temperature (Tg) of the polyester polyurethane resin which is included in the protective layer of interest. In addition, it is also possible to identify whether the interest is polyester polyurethane or not, by carrying out the infrared absorption (FT-IR) analysis for observing absorption(s) of urethane bond, absorption(s) of ester bond.

The "specified polyester polyurethane resin" has an essential condition of having a glass transition temperature (Tg) of not less than 50° C. With respect to the upper limit of the glass transition temperature (Tg), although there is no particular limitation, there is a tendency that the foil tearing property of the transfer layer 20 which includes the protective layer of the second embodiment becomes lower as the glass transition temperature exceeds 70° C. Thus, it is preferable that the glass transition temperature (Tg) of the polyester polyurethane resin which is included in the protective layer 3 of the second embodiment is not more than 70° C. However, this point does not limit the upper limit of the glass transition temperature (Tg) of the polyester polyurethane resin. Namely, regardless the upper limited of the glass transition temperature, it is possible to impart a foil tearing property that brings no problem in practical uses to the transfer layer 20 which includes the protective layer of the second embodiment.

With respect to the content of the "specific polyester polyurethane resin" on the basis of the total solid content of the protective layer 3 of the second embodiment, there is no particular limitation. Incidentally, when the content is less than 50% by weight, there may be a tendency that the physical durability and the chemical durability become lower. Thus, it is preferable that the content of the "specific polyester polyurethane resin" is not less than 50% by weight, on the basis of the total solid content of the protective layer 3 of the second embodiment.

<Polyvinyl Alcohol Resin>

Further, it is preferable that the protective layer 3 of the second embodiment contains a polyvinyl alcohol resin having a saponification degree of not less than 80% and a number average molecular weight (Mn) of not less than 300 and not more than 1000, in addition to the "specific polyester polyurethane resin". Hereinafter, the polyvinyl alcohol resin having a saponification degree of not less than 80% and a number average molecular weight (Mn) of not less than 300 and not more than 1000 is sometimes referred to as "specific polyvinyl alcohol resin". Herein, the "saponification degree" used in the present invention refers to the value obtained by dividing the number of moles of vinyl alcohol structures in the polymer by the number of moles of all monomers in the polymer. Further, the number average molecular weight (Mn) and the weight average molecular weight (Mw) used herein denotes a value measured by the gel permeation chromatography (GPC) and calibrated with polystyrene standard.

When the protective layer 3 of the second embodiment contains the "specific polyvinyl alcohol resin" in addition to the "specific polyester polyurethane resin", it is possible to attain a further improvement in the plasticizer resistance as one of the chemical durability. The precise mechanism about why the plasticizer resistance is improved when the protective layer 3 of the second embodiment includes the "specific polyvinyl alcohol resin" has been not fully elucidated. However, since the polyvinyl alcohol resin owns hydroxyl groups in its structure, and it is expected that the hydroxyl groups repel the plasticizer component, and thus the plasticizer resistance can be improved. Incidentally, instead of the "specific polyvinyl alcohol resin", using a polyvinyl alcohol resin other than the specific polyvinyl alcohol resin, for example, a polyvinyl alcohol resin having a saponification degree of less than 80%, the improvements in the plasticizer resistance and the solvent resistance become lower, as compared with those in the case of using the "specific polyvinyl alcohol resin". In addition, using a polyvinyl alcohol resin having a number molecular weight of less than 300, or having a number molecular weight of more than 1000, the improvement in the foil tearing property becomes lower, as compared with that in the case of using the "specific polyvinyl alcohol resin".

In addition, in the case that the "specific polyester polyurethane resin" is a water dispersible polyurethane resin, the concurrent use of the "specific polyvinyl alcohol resin" can bring an improvement in the film forming property. Further, the improvement in the film forming property can be followed by further improvements in the foil tearing property as well as the physical durability and the chemical durability.

With respect to the content of the "specific polyvinyl alcohol resin" on the basis of the total solid content of the protective layer 3 of the second embodiment, there is no particular limitation. Incidentally, when the content is less than 5% by weight, the effects of adding the "specific polyvinyl alcohol resin" would be hardly expected. When the content is more than 50% by weight, since the content of the "specific polyester polyurethane resin" is forced to decrease with increase in the "specific polyvinyl alcohol resin", there is a tendency that the improving effect in the foil tearing property which is brought by the "specific polyvinyl alcohol resin" becomes lower. Further, the interlayer adhesiveness between the protective layer 3 and any optional layer which constitutes the transfer layer is lowered with increase in the "specific polyvinyl alcohol resin", and thus there is a tendency that the abrasion resistance of the printed article on which the transfer layer 20 has been transferred is reduced. Therefore, considering this point, it is desirable that the "specific polyvinyl alcohol resin" is contained in the range of not less than 5% by weight and not more than 50% by weight, more preferably, in the range of not less than 10% by weight and not more than 30% by weight, on the basis of the total solid content of the protective layer 3 of the second embodiment.

<Filler>

It is preferable that the protective layer 3 of the second embodiment contains a filler having a particle diameter of not than 200 nm, in addition to the "specific polyester polyurethane resin". When the protective layer 3 of the second embodiment includes the filler having a particle diameter of not more than 200 nm, it is possible to further improve the foil tearing property without deteriorating the improving effect on the physical durability and the chemical durability which are brought by the "specific polyester polyurethane resin". The precise mechanism about why the above mentioned excellent effects are brought by adding the filler having a particle diameter within the above mentioned range into the protective layer 3 of the second embodiment has been not fully elucidated. However, it is expected that the shearing of the protective layer 3 of the second embodiment may be improved by addition of the filler having a particle diameter within the above mentioned range into the protective layer 3 of the second embodiment, and the improvement in the shearing would contribute to the improvement in the foil tearing. Further, since the particle diameter of the filler to be contained in the protective layer 3 of the second embodiment is very small as it is not more than 200 nm, it is expected that the filler would be less likely to cause deterioration in the durability of the protective layer 3 of the second embodiment.

The particle diameter of the filler used herein means volume average particle diameter. For example, the particle diameter of the filler can be measured by the BET method, or analyzing results of the electron microscopic observation image with an image analysis type particle size distribution measuring software.

As the filler to be contained in the protective layer 3 of the second embodiment, as long as it satisfies the condition that the particle diameter thereof is not more than 200 nm, any of organic fillers, inorganic fillers, and organic-inorganic hybrid type fillers can be used preferably. These fillers may be in powder form or in a sol form. As the powdery organic filler, for instance, acrylic particles, such as non-cross linked acrylic particles and cross linked acrylic particles; polyamide particles; fluorine-contained resin type particles; polyethylene waxes, etc., can be enumerated. As the powdery inorganic filler, for instance, calcium carbonate particles, and metal oxide particles such as silica particles and titanium oxide, etc., can be enumerated. As the organic-inorganic hybrid type filler, for instance, the filler in which silica particles are hybridized with acrylic resin, etc., can be enumerated. As the sol type filler, for instance, silica sol type, organosol type, etc., can be enumerated. These fillers may be used solely on an individual basis, or may be used as a mixture of two or more of them in combination.

There is no particular limitation about the content of the filler having above mentioned particle diameter. However, when the filler content is less than 5% by weight, on the basis of the total solid content of the protective layer 3 of the second embodiment, it may not be able to satisfy fully the foil tearing property. On the other hand, when it exceeds 30% by weight, there is a tendency that durability and transparency of the protective layer 3 of the second embodiment is reduced. Therefore, considering this point, it is desirable that the filler is contained in the range of not less than 5% by weight and not more than 30% by weight on the basis of the total solid content of the protective layer 3 of the second embodiment.

The protective layer 3 of the second embodiment may contain any other optional component(s), in addition to, or instead of, the above mentioned optional components, the specific polyvinyl alcohol resin and the filler having the particle diameter of not more than 200 nm. As the other optional component(s), the other optional component(s) as described above in the explanation of the protective layer 3 of the first embodiment can be used as-is, and thus, the detailed description thereof is omitted here.

In the above explanation, with respect to the protective layer transfer sheet of the construction shown in FIG. 1, the structure where the release property from the substrate 1 and the adhesive property to the transfer receiving articles are given to the protective layer of the first embodiment or the protective layer of the second embodiment has been mainly described. As shown in FIG. 2, however, it may be configured to grant these roles to separate the layers. That is, in the protective layer transfer sheet of the first embodiment of the present invention, it is possible to take a single layer configuration where only the protective layer is transferred as a transfer layer 20 onto the transfer receiving article as shown in FIG. 1, or alternatively, it is also possible to take a multi-layered configuration where any layers as well as the protective layer 3 of the first embodiment or the protective layer 3 of the second embodiment is transferred as the transfer layer 20 onto the transfer receiving article as shown in FIG. 2. In the protective layer transfer sheet 10 shown in FIG. 2, a peeling layer 2 is provided between the substrate 1 and the protective layer 3 of the first embodiment or the protective layer 3 of the second embodiment, and the adhesive layer 4 is provided on the protective layer 3 of these embodiments. Hereinafter, the protective layer of the first embodiment and the protective layer of the second embodiment are collectively called "protective layer 3" simply.

(Peeling Layer)

As shown in FIG. 2, it is possible to provide a peeling layer 2 between the substrate 1 and the protective layer 3. As component(s) which constitutes the peeling layer 2, the materials exemplified above as the "component having abrasion resistance", and the "component having release property from the substrate" may be used by selecting appropriately. It should be noted that the peeling layer 2 is usually a layer to be transferred onto the transfer receiving article, together with the usual protective layer 3, it may be designed as a layer that remains on the substrate 1 side. When the peeling layer 2 is transferred to a transfer receiving article side, since the peeling layer comes to be located on the outermost surface after the transfer, it is preferable that the peeling layer contains the "component having abrasion resistance". On the other hand, when the peeling layer 2 remains on the substrate 1 side, since the protective layer 3 comes to be located on the outermost surface after transfer, it is preferable that the protective layer 3 contains the "component having abrasion resistance" as described above. In the case that the peeling layer 2 is transferred together with the protective layer 3 onto the to the transfer receiving article, when the peeling layer 2 contains the lubricant such as exemplified above, a further improvement in the abrasion resistance can be expected.

As a method of forming the peeling layer 2, for instance, the peeling layer 2 can be formed by preparing a coating liquid for the peeling layer where the above mentioned "component having abrasion resistance", the above mentioned "component having release property from the substrate" are dispersed or dissolved in an appropriate solvent, coating thus prepared coating liquid for peeling layer on the substrate 1, in accordance with a known coating procedure such as the gravure printing method, the screen printing method, the reverse roll coating printing method using a gravure plate, or the like, and then drying the coated solution. In general, the thickness of the peeling layer 2 may be in the range of 0.5 μm-5 μm.

(Peeling Layer of Preferred Embodiment)

Next, a preferred embodiment of the peeling layer to be used in combination with the above mentioned protective layer 3 will be described.

The peeling layer 2 of the preferred embodiment contains at least one selected from a group consisting of polyester resins, acrylic urethane resins, and epoxy resins. According to the transfer layer 20 which includes the peeling layer of the preferred embodiment, it is possible to further improve the transferability and the foil tearing property of the transfer layer 20. In addition, by a synergistic effect with the protective layer of the first embodiment or the protective layer of the second embodiment, it is possible to impart a further enhanced durability to the printed article on which the transfer layer 20 has been transferred. Hereinafter, the peeling layer of the preferred embodiment is referred to as "peeling layer (A)".

The precise mechanism about why the foil tearing property of the whole transfer layer 20 is improved when the peeling layer (A) which contains at least one selected from a group consisting of polyester resins, acrylic urethane resins, and epoxy resins has been not fully elucidated. However, it has been considered that the foil tearing property of the transfer layer 20 would be greatly influenced with the foil tearing property of the layer nearest the substrate among the layers constituting the transfer layer 20, and thus it is assumed that the adhesion to the substrate, and the transferability (it is also called releasability, or peeling ability.) from the substrate upon the transfer of the transfer layer 20, have a close relationship with the foil tearing property. Since the peeling layer (A) which contains at least one selected from a group consisting of polyester resins, acrylic urethane resins, and epoxy resins maintains an appropriate adhesiveness with the substrate before the transfer of the transfer layer 20, and it also excels in the transferability, the tearing property of the peeling layer (A) itself becomes good. Thus, it is assumed that the above mentioned protective layer, which is provided on the peeling layer (A), may follow the good foil tearing property of the peeling layer 2, so that the foil tearing property of the whole transfer layer 20 is improved.

Incidentally, there are some cases that the transferability of the transfer layer 20 becomes insufficient when the transfer layer is composed of a peeling layer known in this art in combination with the above mentioned protective layer 2. With respect to the peeling layers as known in this art, there are some cases having an excellent transferability. However, the adoption of such a known peeling layer having an excellent transferability may be followed by a case of not sufficiently satisfying the foil tearing property of the transfer layer 20, or a case of not sufficiently satisfying the durability. That is, when the transfer layer comprises the protective layer 3 as described above and the known peeling layer, the effect to satisfy all of the requirements concurrently, i.e., transferability, foil tearing property and the durability for the whole transfer layer, becomes lower, as compared with the case that the transfer layer comprises the protective layer 3 as described above and the peeling layer (A).

In addition, when the transfer layer is composed of the peeling layer (A) in combination with a protective layer known in the art which is different from the above mentioned protective layer and the protective layer as described in the explanation for the protective layer transfer sheet of the second embodiment, the durability to be imparted to the printed article would becomes lower, whereas the transferability of the transfer layer is good. Further, depending on the kind of component (s) added to the protective layer, there may be some cases where the foil tearing property of the protective layer itself is inferior, and thus, even in the case of combining with the peeling layer (A), the foil tearing property of the whole transfer layer may be not sufficiently satisfied. With respect to the protective layers as known in this art, there are some cases having an excellent durability. However, the adoption of such a known protective layer having an excellent durability in combination with the peeling layer (A) would be followed by a significant deterioration of the foil tearing property. This fact would be apparent from the results of Examples and Comparative examples described later.

"The Polyester Resin"

Herein, the polyester resin is defined as a polymer which has ester groups and is obtained by polycondensation of polyvalent carboxylic acid and polyhydric alcohol. As the polyvalent carboxylic acid, for instance, terephthalic acid, isophthalic acid, phthalic acid, 2,6-naphthalene dicarboxylic acid, adipic acid, sebacic acid, decane dicarboxylic acid, azelaic acid, dodeca dicarboxylic acid, cyclohexane dicarboxylic acid, and the like may be enumerated. As the polyhydric alcohol, for instance, ethylene glycol, propane diol, butane diol, pentane diol, hexane diol, neopentyl glycol, 1,4-cyclohexane dimethanol, decane diol, 2-ethyl-butyl-propane diol, bisphenol A, and the like may be enumerated. Further, the polyester resin used in the present invention may be a copolymer of three or more kinds of etc. In the polyester resin used in the present invention, three or more kinds of polyvalent carboxylic acid(s) and polyhydric alcohol(s), or may be a copolymer of monomers or polymers, such as, diethylene glycol, triethylene glycol, polyethylene glycol, and the like. Further, the polyester resin used herein also involves modified bodies of the above mentioned polyester resins. As the modified body of the polyester resin, for example, polyester urethane resin and the like can be exemplified. As the polyester urethane resin, which is an example of the modified bodies of the polyester resin, it is possible to use any commercially available product, as-is. As the commercially available product, for example, UR series, manufactured by TOYOBO Co., ltd., etc., may be exemplified.

With respect to the polyester resin, it is preferable to have a weight average molecular weight (Mw) in a range of not less than 2000 and not more than 25000. In addition, it is preferable to have a glass transition temperature (Tg) in a range of not less than 40° C. and not more than 90° C. When a polyester resin the weight average molecular weight (Mw) and the glass transition temperature (Tg) of which are within the above ranges is used, it is possible to further improve the foil tearing property and durability of the whole transfer layer 20.

"Acrylic Urethane Resin"

Herein, the acrylic urethane resin is defined as (A1) a resin which is obtained by reaction of an acrylic resin having an acid value and an isocyanate curing agent, or (A2) a resin which is obtained by reaction of an acrylic polyol and an isocyanate curing agent. Incidentally, in the case that the peeling layer contains the urethane resin which has been as known in this art, instead of the acrylic urethane resin, the foil tearing property of the whole transfer layer 20, and the degree of improvement in the durability become lower.

As the acrylic resin having an acid value which forms the acrylic urethane resin (A1), for example, acrylic resin having a carboxyl group and the like can be enumerated. As the acid value of the acrylic resin having an acid value, it is preferred to be not less than 2 and not more than 30. The acid value of acrylic resin can be measured by the method in accordance with JIS K 0070.

In addition, it is preferable that the acrylic resin having an acid value has a glass transition temperature in a range of not less than 40° C. and not more than 110° C. The weight average molecular weight (Mw) of the acrylic resin having an acid value is preferably in the range of not less than 15000 and not more than 80000.

The acrylic polyol resin which forms the acrylic urethane resin (A2) means acrylic resin having hydroxyl groups, and the acrylic polyol resin described in the above explanation for the protective layer 3 can be used with an appropriately selecting.

As the isocyanate curing agent which forms the acrylic urethane resins (A1) and (A2), the isocyanate curing agent described in the above explanation for the protective layer 3 can be used as-is, and thus, detailed description thereof will be omitted here.

Comparing the foil tearing property of the peeling layer (A) which contains the acrylic urethane resin (A1) with that of the peeling layer (A) which contains the acrylic urethane resin (A2), the former peeling layer (A) which contains the acrylic urethane resin (A1) is better in the foil tearing property than the latter. Therefore, for the purpose of further improvement of the foil tearing property, it is preferable that the peeling layer (A) contains the acrylic urethane resin (A1). Incidentally, with respect to the foil tearing property, the peeling layer containing the polyester resin (A), and the peeling layer containing an epoxy resin described later are equivalent to the peeling layer (A) containing the acrylic urethane resin (A1), and thus, it can be said that they are also preferred for the foil tearing property.

"Epoxy Resin"

Herein, the epoxy resin is defined as the resin (B1) which is obtained by reaction of epoxy groups, or the resin (B2) which is obtained by reaction of an curing agent having epoxy group(s) with a reactive resin capable of reacting with the epoxy group(s).

As the epoxy resin (B1), for example, a phenoxy resin which is derived from bisphenol A and epichlorohydrin, and has a repeating unit of the following general formula (I), can be enumerated.

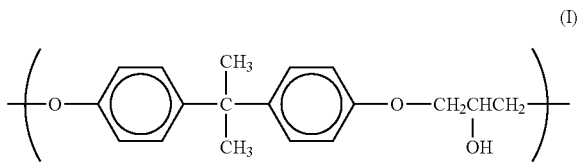

The weight average molecular weight (Mw) of the epoxy resin (B1) is preferably in the range of not less than 20000 and not more than 80000.

The epoxy resin (B1) may be a modified epoxy resin. As the modified epoxy resin, for instance, modified epoxy resins which are modified with a partial hydrolysis of a polyfunctional silane coupling agent, modified epoxy resins in which hydroxyl group(s) of the phenoxy resin has been blocked with ester group(s), amide group(s), ether group(s), or silyl ether group(s), etc., can be enumerated.

The epoxy resin (B2) is the one which is obtained by reacting and curing a reactive resin having functional group(s) capable of reacting with the epoxy group(s) with an epoxy curing agent having epoxy groups. The epoxy curing agent having epoxy groups as referred to herein means a "curing agent having at least two epoxy groups in one molecule". As the curing agent having epoxy groups, for example, bisphenol type epoxy resins such as bisphenol A type epoxy resins, bisphenol F type epoxy resins; cresol novolak type epoxy resins; phenol novolak type epoxy resins; aliphatic cyclic type epoxy resins; glycidyl ester type epoxy resins; glycidyl amine type epoxy resin; heterocyclic epoxy resins, etc., can be mentioned.

As the reactive resin having functional group(s) capable of reacting with an epoxy group(s), for example, resins which owns functional group(s) such as amino group, isocyanate group, carboxyl group, phenolic hydroxyl group, hydroxyl group, acid anhydride, thiol group and amide group, and the like can be exemplified. As concrete examples, for instance, amino-modified acrylic resin, hydroxyl group-containing resin, carboxyl group-containing resin and the like can be exemplified. The epoxy resin which is prepared by curing the amino-modified acrylic resin with the curing agent having epoxy groups are particularly preferable, since it is extremely superior in the durability and the foil tearing property.

Although the peeling layer (A) is adequate as long as it contains at least one resin selected from the group consisting of polyester resins, acrylic urethane resins, and epoxy resins as described above, it may contains two or more kinds of them. The polyester resin, the acrylic resin, and the polyurethane, even when they are used in their each individual single form, or used in any of their combinations, can improve the transferability of the transfer layer 20, the foil tearing property of the transfer layer 20, and the durability which is imparted to the printed article to which the transfer layer 20 has been transferred.

With respect to the content of the polyester resin(s), acrylic urethane resin(s), and/or the epoxy resin(s) on the basis of the total solid content of the peeling layer (A), it is preferable to be not less than 1% by weight. In the case that two or more of these resins are used in combination, the content is based on the total content of the used resins. When the content is less than 1% by weight, there is a tendency that improving effect on the transferability which is imparted by these resins to the peeling layer (A), and improving effect on the foil tearing property become lower. For the purpose of further improvement of the transferability and/or the foil tearing property, it is preferable that the acrylic urethane resin, and/or the epoxy resin contains in the range of not less than 30% by weight, on the basis of the total solid content of the peeling layer (A). With respect to the polyester resin, even when it is contained with a relatively low content on the basis of the total solid content of the peeling layer (A), for instance, an amount in the range of less than 30% by weight, it is possible to impart a good transferability and a good foil tearing property to the peeling layer (A). The upper limit of the content can be set appropriately in consideration of amount of any other optional components, or the like, and is not particularly limited, and can take a 100% by weight. Here, it should be noted that the content of the polyester resin, the acrylic urethane resin, and/or the epoxy resin in the present invention is not limited by the above description, and by the content of the polyester resin, the acrylic polyurethane resin, and the epoxy resin contained in the peeling layer (a), it is possible to improve the transferability and the foil tearing property of the peeling layer, as compared with those of the peeling layer known in the art which does not contain any of the resins of interest.

In addition, in the peeling layer (A), if necessary, it is possible to add any other optional component (s). For example, for the purpose of further improving the transferability of the transfer layer 20 form the substrate, the peeling layer (A) may contain, for example, waxes such as polyethylene waxes and silicone waxes, silicone resins, silicone modified resins, fluorine-contained resins, fluorine-modified resins, polyvinyl alcohol, acrylic resins, thermally crosslinkable epoxy-amino resins and thermally-crosslinkable alkyd-amino resins, etc.

In addition, the peeling layer (A) may also contain components other than the component having release property from the substrate, i.e., for example the component having abrasion resistance, and the lubricant, etc., which has been described in the above explanation for the above protective layer 3 excellent transferability of the base material 1, a separation layer (A), the protective layer 3 having abrasion resistance component, and may contain a lubricant or the like.

There is no particular limitation on the method for forming the peeling layer (A), and for instance, the peeling layer (A) can be formed by preparing a coating liquid for the peeling layer where at least one resin selected from the group consisting of polyester resins, acrylic urethane resins, and epoxy resins, and optionally, any component as necessary, are dispersed or dissolved in an appropriate solvent, coating thus prepared coating liquid for peeling layer on the substrate 1, or on a layer which has been optionally provided on the substrate 1, in accordance with a known coating procedure such as the gravure printing method, the screen printing method, the reverse roll coating printing method using a gravure plate, or the like, and then drying the coated solution. Although there is no particular limitation on the thickness of the peeling layer (A), but it is preferable to be in the range of not less than 0.2 μm and not more than 5 μm.

(Plasticizer Resistive Layer)

In order to improve the plasticizer resistance of the printed article to which the transfer layer 20 was transferred, a plasticizer resistive layer (not shown) may be provided between the substrate 1 and the protective layer 3, and in the case that the peeling layer 5 is provided, it may be provided between the peeling layer 2 and the protective layer 4. The plasticizer resistive layer is an optional layer which constitutes the transfer layer 20. This point is also applicable to the protective layer transfer sheet of the second embodiment.

As the plasticizer resistive layer, a substance which repels the plasticizer component, or a substance which gives the plasticizer component difficulties in reaching the printed image, can be preferably used. As the above-mentioned substance which repels the plasticizer component, for instance, polyvinyl alcohol resin, polyvinyl butyral resin, polyvinyl acetal resin, polyvinyl pyrrolidone resin, etc., can be enumerated. As the substance which gives the plasticizer component difficulties in reaching the printed image, cationic resins such as cationic urethane emulsion, etc., can be enumerated. These substances may be used solely on an individual basis, or may be used as a mixture of two or more of them in combination.

In addition, with respect to polyvinyl alcohol resin, polyvinyl butyral resin, and polyvinyl acetal resin, which has been exemplified as the substance which repels the plasticizer component, it is preferable to have a saponification degree in the range of 30-100%, and more desirably, to have a saponification degree in the range of 60-100%. When the polyvinyl alcohol resin, polyvinyl butyral resin, or polyvinyl acetal resin, which has a saponification degree in the above-mentioned range, is contained in the plasticizer resistive layer, it can be expected to improve further the plasticizer resistance of the transfer layer which includes the protective layer 3. Herein, the "saponification degree" used in the present invention refers to the value obtained by dividing the number of moles of vinyl alcohol structures in the polymer by the number of moles of all monomers in the polymer. Further, it is preferable that the substance which repels the plasticizer component, or the substance which gives the plasticizer component difficulties in reaching the printed image is contained in the plasticizer resistive layer so that the weight of the substance is in the range of 20-100% by weight on the basis of the total weight of the plasticizer resistive layer.

Further, if necessary, it is possible to add to the plasticizer resistive layer, any additives, for example, lubricants, plasticizers, fillers, antistatic agents, anti-blocking agents, cross-linking agents, antioxidants, UV absorbers, light stabilizers, colorants such as dyes and pigments, fluorescent whitening agents, etc.

As the method for forming the plasticizer resistive layer which is optionally provided if necessary, such a procedure in which one or more members of the substances exemplified as above, and optionally, any various material which are added if necessary, are dissolved or dispersed in an appropriate solvent in order to prepare a coating liquid for plasticizer resistive layer, and the coating liquid thus prepared is coated on the substrate sheet 1, or on the peeling layer 2 which is optionally provided if necessary, and then the coated film is dried, may be applicable. Although there is no particular limitation on the thickness of the plasticizer resistive layer, the plasticizer resistive layer is usually about 0.1 μm-50 μm in thickness after drying, and preferably, about 1 μm-20 μm in thickness after drying.

The plasticizer resistance layer as described above is applicable to the protect layer transfer sheet of the second embodiment as it is.

(Adhesive Layer)

Further, as shown in FIG. 2, it is possible to provide an adhesive layer 4 on the protective layer 3. The adhesive layer is an optional layer which constitutes the transfer layer 20. As a component of the adhesive layer 4, it can be used by selecting the components exemplified in the above mentioned "component having adhesiveness to the transfer receiving article" and the like as appropriate. Incidentally, if a certain measure to satisfy the adhesion to the protective layer 3 is taken on the transfer receiving article's side, the adhesive layer 4 is not necessarily provided on the protective layer 3.

As the method of forming the adhesive layer 4, for instance, the adhesive layer 4 can be formed by preparing a coating liquid for the adhesive layer where the above mentioned "component having adhesive property to the transfer receiving article" is dispersed or dissolved in an appropriate solvent, coating thus prepared coating liquid for adhesive layer on the protective layer 3, in accordance with a known coating procedure such as the gravure printing method, the screen printing method, the reverse roll coating printing method using a gravure plate, or the like, and then drying the coated solution. In general, the thickness of the adhesive layer 4 may be in the range of 0.5 μm-10 μm.

The adhesive layer as described above is applicable to the protect layer transfer sheet of the second embodiment as it is.

In the above explanation, as an example of the transfer layer having the multi-layered structure, the structure where the transfer layer includes a peeling layer, a plasticizer resistance layer and an adhesive layer has been described. Depending on the kinds of the components contained in the optional layers which constitute the transfer layer, for example, depending on the kinds of the components contained in the peeling layer, the plasticizer resistance layer and the adhesive layer, there are some cases that the foil tearing property for each individual optional layer, per se, becomes insufficient. In the protective layer transfer sheet according to the present invention, even in the case that the transfer layer takes the multi-layered structure, and even if the foil tearing property of each individual optional layer which is transferred with the protective layer is low, since the protective layer 3 which is included in the transfer layer and which is an essential layer to be transferred to the transfer receiving article excels in the foil tearing property as described above, it is possible to improve the foil tearing property for the whole of the transfer layer including the protective layer 3 and the optional layers.

(Back Face Layer)

As shown in FIG. 2, a back face layer 5 may be provided on a surface of the substrate 1 which is different from another surface on which the protective layer 3 is provided, in order to improve the heat resistance, and to give driving stability to a thermal head on printing. Incidentally, the back face layer 5 is an optional component in the protective layer transfer sheet 10 according to the first embodiment of the present invention.

The back face layer 5 can be formed by selecting any conventionally known thermoplastic resin as appropriate. As such a thermoplastic resin, for instance, polyester type resins, polyacrylic ester type resins, polyvinyl acetate type resins, styrene acrylate type resins, polyurethane type resins, polyolefin type resins such as polyethylene type resins and polypropylene type resins, polystyrene type resins, polyvinyl chloride type resins, polyether type resins, polyamide type resins, polyimide type resins, polyamide-imide type resins, polycarbonate type resins, polyacrylamide type resins, polyvinyl chloride resins, polyvinyl butyral resins, and polyvinyl acetal resins, and silicone-modified forms of these thermoplastic resins may be enumerated. Among them, from the viewpoint of heat resistance, polyamide-imide resin and its silicone-modified form, or the like is desirable.

Furthermore, the back face layer 5 may preferably contain various additives, such as, a releasing agent such as waxes, higher fatty acid amides, phosphoric acid ester compounds, metal soaps, silicone oils, surfactants, etc., an organic powder such as fluorine-contained resin powders, and/or an inorganic compounds such as silica, clay, talc, calcium carbonate, etc, in addition to the thermoplastic resin, for the purpose of improving the slipping property. Particularly, it is preferable to include at least one of phosphoric acid ester compounds and metal soaps.

The back face layer 5 can be formed by preparing a coating liquid for the back face layer where one or more of the thermoplastic resin as mentioned above, and optionally, any additives as necessary, are dispersed or dissolved in an appropriate solvent, coating thus prepared coating liquid on the substrate 1 in accordance with a known coating procedure such as the gravure printing method, the screen printing method, the reverse roll coating printing method using a gravure plate, or the like, and then drying the coated solution. From the viewpoint of improvement of heat resistance and so on, it is preferable that the thickness of the back face layer 5 is about 0.1 $g/m^2$-about 5 $g/m^2$, and, more desirably, about 0.3 $g/m^2$-about 2.0 $g/m^2$ The backing layer described above is applicable to the protect layer transfer sheet of the second embodiment as it is.

<<Protective Layer Transfer Sheet of the Second Embodiment>>

Now, the protective layer transfer sheet 10 of the second embodiment according to the present invention will be described in detail. As shown in FIG. 2, the protective layer transfer sheet 10 of the second embodiment of the present invention comprises a substrate 1 and a transfer layer 20 which is peelably provided on a surface of the substrate 1, wherein the transferable protective layer 20 comprises a layered structure in which a peeling layer 2 and a protective layer 3 are provided in this order from the substrate 1 side. The substrate 1, as well as the peeling layer 2 and the protective layer 3 which include the transfer layer 20, are essential components in the protective layer transfer sheet 10 of the second embodiment of the present invention.

The protect layer transfer sheet 10 of the second embodiment is characterized in that the peeling layer which is included in the transfer layer 20 contains at least one selected from the group consisting of the polyester resins, the acrylic urethane resins, and the epoxy resins; and that the protective layer contains the acrylic polyol resin having a glass transition temperature (Tg) of not less than 50° C. In other words, it is characterized in that the transfer layer 20 comprises the protective layer which contains the acrylic polyol resin having a glass transition temperature (Tg) of not less than 50° C., and the peeling layer (A) which has been described as the peeling layer of preferred embodiment in the above explanation of the protective layer transfer sheet of the first embodiment. According to the protect layer transfer sheet 10 of the second embodiment having this feature, the transfer layer 20 can possess an excellent transferability and a superior foil tearing property, and it is possible to impart a sufficient durability to the printed article onto which the transfer layer 20 has been transferred.

(Substrate)

The substrate 1 is an essential component of the protective layer transfer sheet 10 according to the second embodiment of the present invention, and it is provided for the purpose of supporting the transfer layer 20, and the back face layer 5 which is optionally provided on the other surface of the substrate 1. As the substrate 1, it is possible to use the same substrate as described above in the explanation for the protective layer transfer sheet of the first embodiment of the present invention, and thus, a detailed description thereof will be omitted here.

(Transfer Layer)

The transfer layer 20 provided on the substrate 1 is the layer to be transferred onto the transfer receiving article at the time of the thermal transfer, by being peeled from the substrate. In the protective layer transfer sheet of the second embodiment, the transfer layer 20 includes the peeling layer 2 and the protective layer 3 as the essential layers, and as shown in FIG. 2, the transfer layer 20 shows a layered structure in which the peeling layer and the protective layer 3 are provided in this order from the substrate 1 side. The transfer layer 20 may have any optional layer(s) in addition to the peeling layer 2 and the protective layer 3. For instance, as shown in FIG. 2, an adhesive layer may be included in the transfer layer 20. Further, any optional layer(s) may be provided between the peeling layer 2 and the protective layer 3.

With respect to the transfer layer which includes the above mentioned peeling layer 2 and the protective layer 3, it is required that (1) the transfer layer has a good foil tearing property when it is transferred onto the transfer receiving article, (2) the transferable protective layer has durability such as, heat resistance, and wearing resistance, plasticizer resistance, solvent resistance and the like (hereinafter, these are referred to simply as "durability"), and (3) the transfer layer has a good releaseability from the substrate. Incidentally, there is a trade-off relationship between the foil tearing property of the transfer layer 20 and the durability of the transfer layer 20. Thus, when focusing on improvement in the foil tearing property, it would become impossible to satisfy the durability of the transfer layer 20. On the other hand, when focusing on improvement in the durability, a problem that the foil tearing property of the transfer layer 20 becomes lower would arise. Therefore, in the protective layer transfer sheet according to the second embodiment of the present invention, in order to satisfy the above mentioned requirements (1)-(3) that are required for the transferable protective layer 20, the peeling layer 2 and the protective layer 3, which are included in the transfer layer 20, have features described below. Now, the peeling layer 2 and the protective layer 3 will be explained concretely.

(Protective Layer)

As shown in FIG. 1 and FIG. 2, in the protective layer transfer sheet of the second embodiment, the transfer layer 20 includes a protective layer 3, as an essential layer, and the protective layer 3 is provided directly or indirectly on the peeling layer 2 described later (in the embodiment shown in Figure, it is provided directly on the peeling layer 2.). Here, the protective layer 3 is a layer which is transferred onto a transfer receiving article upon the thermal transfer.

In the protect layer transfer sheet of the second embodiment, the protective layer 3 which constitutes the transfer layer 20 includes an acrylic polyol resin. As explained in the protective layer of the first embodiment, the glass transition temperature (Tg) of the acrylic polyol resin has a close relationship with the durability and the foil tearing property which are imparted to the protective layer 3. Here, before an explanation of the protective layer 3 in the protect layer transfer sheet of the second embodiment, the durability in the case that it is assumed that the transfer layer peelably provided on the substrate consists of a protective layer alone will be explained. When only an acrylic polyol resin having a glass transition temperature (Tg) of less than 50° C. is contained in the single layered transfer layer 20 which consists of the protective layer alone, it is impossible to impart a sufficient durability to the single layered transfer layer 20 which consists of the protective layer alone.

Even when the acrylic polyol resin having a glass transition temperature (Tg) of less than 50° C. is allowed to be cured sufficiently, the durability such as abrasion resistance, plasticizer resistance, solvent resistance and the like, obtained by this resin is lower than that obtained by an acrylic polyol resin having a glass transition temperature (Tg) of not less than 50° C.

Namely, in the case that only an acrylic polyol resin having a glass transition temperature (Tg) of less than 50° C. is contained in the single layered transfer layer, it is impossible to meet the requirements for the durability, regardless of whether the acrylic polyol resin is cured by the curing agent or not.

Therefore, the protect layer transfer sheet of the second embodiment is characterized in that the protective layer 3 which is contained in the transfer layer 20 includes an acrylic polyol resin having a glass transition temperature (Tg) of not less than 50° C. The acrylic polyol resin having a glass transition temperature (Tg) of not less than 50° C. is a component which has a focus on mainly imparting durability to the protective layer which constitute the transfer layer 20. By improving the durability of the protective layer, the durability of the whole transfer layer 20 is also improved. Hereinafter, the acrylic polyol resin having a glass transition temperature (Tg) of not less than 50° C. is sometimes referred to as "acrylic polyol resin (B)".

The acrylic polyol resin (B), regardless of whether the acrylic polyol resin (B) has been cured by curing agent or not, and regardless of whether the degree of curing, can impart a sufficient durability to the transfer layer 20. Incidentally, the lower limit of the glass transition temperature (Tg) of the acrylic polyol resin (B) is set to be lower than the lower limit of the glass transition temperature (Tg) of the acrylic polyol resin (A) which is included in the protective layer 3 of the first embodiment according to the protective layer transfer sheet of the above mentioned first embodiment. With respect to the protective layer transfer sheet of the above mentioned first embodiment, in the case that the protective layer contains the acrylic polyol resin having a glass transition temperature (Tg) of not more than 80° C., it is impossible to sufficiently satisfy the durability, as described above. On the other hand, with respect to the protective layer transfer sheet of the second embodiment, since the transfer sheet contains a peeling layer (A) described later as an essential component, and thus, a synergistic effect of the protective layer containing the acrylic polyol resin (B) and the peeling layer described later is enabled, it is possible to impart a sufficient durability to the transfer layer 20.

Even if the acrylic polyol resin (B) is not cured, the durability of the transfer layer 20 which includes this uncured acrylic polyol resin (B) and the peelable layer (A) having above mentioned features is higher than that of the single layered transfer layer which contains a cured acrylic polyol resin wherein an acrylic polyol resin having a glass transition temperature of less than 50° C. has been completely cured by a curing agent.

When it is intended to further improve the durability of the transfer layer 20, it is preferable that the protective layer 3 contains a cured acrylic polyol resin wherein the acrylic polyol resin (B) is cured by a curing agent. Hereinafter, the cured acrylic polyol resin in which the acrylic polyol resin (B) is cured by a curing agent is sometimes referred to as "cured acrylic polyol resin (B)". According to the protective layer 3 which contains the cured acrylic polyol resin (B), it is possible to further improve the durability of the transfer layer 20.

The acrylic polyol resin (B) can impart an adequate durability to the transfer layer 20 which includes the protective layer 3 which includes the acrylic polyol resin, even in its uncured form. Further, in the case of the cured acrylic polyol resin (B), even when the curing degree is still low, it is possible to impart a particularly excellent durability to the transfer layer 20 which includes the protective layer 3. Herein, depending upon the hydroxyl value of the acrylic polyol resin (B), there is a fear that the protective layer 3 may become brittle with the progress of curing of the acrylic polyol resin (B). Therefore, in the case that the acrylic polyol resin (B) is cured by the curing agent, it is preferable to adjust the degree of curing in consideration of this point.

With respect to the content of the acrylic polyol resin (B) and/or the cured acrylic polyol resin (B) on the basis of the total solid content of the protective layer 3 in the protective transfer sheet of the second embodiment, there is no particular limitation, and it may be varied appropriately in accordance with the content of other optional component(s), or the like. Incidentally, when the content of the acrylic polyol resin (B) and/or the cured acrylic polyol resin (B) is less than 30% by weight, on the basis of the total solid content of the protective layer 3, there may be some cases where the durability of the whole transfer layer 20 cannot be sufficiently satisfied. In consideration of this point, it is preferable that the acrylic polyol resin (B) and/or the cured acrylic polyol resin (B) are contained in a ratio of not less than 30% by weight, more preferably, not less than 50% by weight, and particularly preferably, not less than 75% by weight, on the basis of the total solid content of the protective layer 3. Here, there is no particular limitation on the upper limit of the content, and it is 100% by weight.

In the protective layer transfer sheet of the second embodiment, the protective layer 3 may contain singly either the acrylic polyol resin (B) or the cured acrylic polyol resin (B), or may contain both of them. Further, the protective layer 3 may contain two or more kinds of the acrylic polyol resins (B) which are mutually different in the glass transition temperature (Tg), as long as they individually satisfy the condition that the glass transition temperature (Tg) is not less than 50° C. In addition, the protective layer 3 may contain two or more kinds of the acrylic polyol resins (B) which are mutually different in the hydroxyl value, the weight average molecular weight, or the like. In such cases, it is preferable that the total weight of these acrylic polyol resins (B) is within the above mentioned preferred range, on the basis of the total solid content of the protective layer 3.

There is no particular limitation on the method for forming the protective layer 3 in the protective layer transfer sheet of the second embodiment, and for instance, the protective layer 3 can be formed by preparing a coating liquid for the protective layer where the acrylic polyol resin (B) and/or the cured acrylic polyol resin (B), and optionally, any component as necessary, are dispersed or dissolved in an appropriate solvent, coating thus prepared coating liquid for protective layer on the peeling layer 2 described later, in accordance with a known coating procedure such as the gravure printing method, the screen printing method, the reverse roll coating printing method using a gravure plate, or the like, and then drying the coated solution. There is no particular limitation about the thickness of the protective layer 3, and the thickness can be appropriately set within the range capable of imparting sufficient durability due to the acrylic polyol resin (B) and/or the cured acrylic polyol resin (B) into good conditions. It is preferable that the thickness of the protective layer 3 is in the range of not less than 0.5 μm and not more than 10 μm.

(Peeling Layer)

As shown in FIG. 1, FIG. 2, in the protective layer transfer sheet of the second embodiment, the transfer layer 20 include a peeling layer as an essential layer, and the peeling layer 2 is provided between the substrate 1 and the above mentioned protective layer 3. The peeling layer 2 is a layer to be transferred onto the transfer receiving article upon the thermal transfer.

In order to satisfy the durability of the transfer layer 20, with respect to the protective layer transfer sheet of the second embodiment, the examples in which the protective layer 3 includes the acrylic polyol resin (B) and/or the cured acrylic polyol resin (B) has been explained as above. When the transfer layer consists of such a protective layer 3 alone, there are cases that the transferability of the transfer layer is insufficient, and cases that the foil tearing property is insufficient. Therefore, the protect layer transfer sheet of the second embodiment is characterized in that a peeling layer which constitutes the transfer layer contains at least one selected from a group consisting of polyester resins, acrylic urethane resins, and epoxy resins. According to the protective layer transfer sheet of the second embodiment which includes such a peeling layer that constitutes the transfer layer, it is possible to improve the transferability of the transfer layer 20, and the protective layer transfer sheet excels in the foil tearing property of the transfer layer 20. In addition, owing to the above mentioned synergistic effect of the protective layer 3 which contains the acrylic polyol resin (B) and the peeling layer, it is possible to impart an excellent durability to the printed article onto which the transfer layer 20 has been transferred.

As the peeling layer which constitutes the transfer layer contains at least one selected from a group consisting of polyester resins, acrylic urethane resins, and epoxy resins, those which have been described as the peeling layer (A) of the preferred embodiment in the above explanation of the protective layer transfer sheet of the first embodiment can be used as-is, thus a detailed description thereof will be omitted here.

As described above, the protective layer transfer sheet 10 according to the first embodiment of the present invention, and the protective layer transfer sheet according to the second embodiment of the present invention are fairly explained. However, without deviating from the scope and the spirit of the present invention, the protective layer transfer sheet 10 according to the first embodiment of the present invention, and the protective layer transfer sheet according to the second embodiment of the present can takes various embodiments other than the ones as disclosed above. For example, the protective layer transfer sheet can be also constructed as a dye layers' integral type protective layer transfer sheet (not shown), wherein dye layers are provided on the same surface of the substrate 1 as the protective layer 3 is provided on, so as to the dye layers are layered in parallel on the substrate across the surface of the substrate, as being frame sequentially. Incidentally, the dye layers may be a single kind of dye layer, or may take a construction, where a yellow dye layer, a magenta dye layer, a cyan dye layer are provided in this order as being frame sequentially.

<<Intermediate Transfer Medium of the First Embodiment>>

Figure 3:
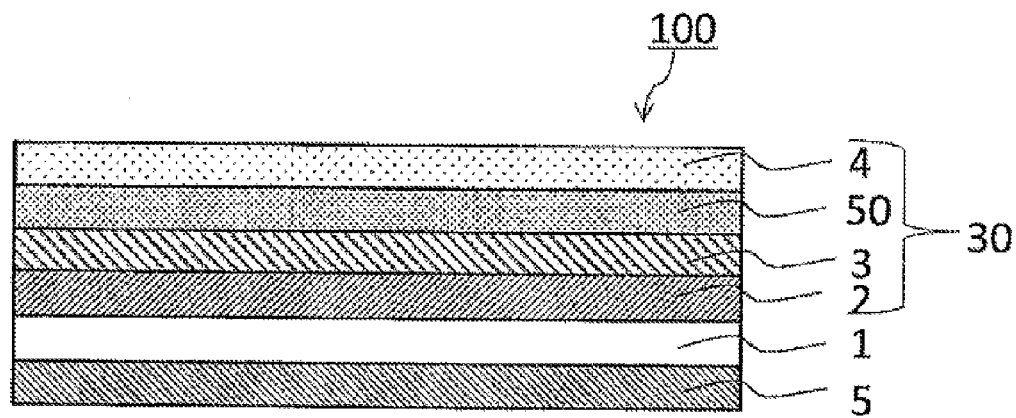
FIG. 3 is a schematic sectional view showing an example of the intermediate transfer medium according to the present invention.

Next, the intermediate transfer medium 100 according to the first embodiment of the present invention will be described below in detail with reference to FIG. 3. The intermediate transfer medium 100 according to the first embodiment of the present invention comprises a substrate 1 and a transfer layer 30 which is peelably provided on a surface of the substrate 1, and the transfer layer 30 comprises a protective layer 3, and a receiving layer 50 which are layered in this order from the substrate 50. The substrate 1, the protective layer 3 and receiving layer 50 are essential components of the intermediate transfer medium 100 according to the first embodiment of the present invention. Incidentally, as shown in FIG. 3, the intermediate transfer medium 100 according to the first embodiment of the present invention may be provided with a peeling layer 2 which is located between the substrate 1 and the protective layer 3, and/or a back face layer which is located on another surface of the substrate 1. Further, it may be provided with an adhesive layer 4 which located on the receiving layer 50. That is, the intermediate transfer medium 100 according to the first embodiment of the present invention is different from the protect layer transfer sheet 10 of the first embodiment described above, in the point that the intermediate transfer medium 100 of the first embodiment has the receiving layer 50 as an essential component in addition to the essential components in the protective layer transfer sheet 10 of the first embodiment. Hereinafter, the components constituting the intermediate transfer medium 100 according to the first embodiment of the present invention will be described in detail.

(Substrate)

As the substrate 1, it is possible to use the same substrate 1 as described above in the explanation for the protective layer transfer sheet 10 of the first embodiment of the present invention, and thus, a detailed description thereof will be omitted here.

(Transfer Layer)

The transfer layer 30 including the protective layer 3 and the receiving layer 50 is provided so as to be able to be peeled from the substrate 1, and is a layer to be transferred onto the transfer receiving article by peeling off from the substrate at the time of thermal transfer. The transfer layer 30 may take a construction which consists of the protective layer 3 and the receiving layer 50, or as shown in FIG. 3, it may take a construction which includes any optional layers in addition to the protective layer 3 and the receiving layer 50. Incidentally, in the embodiment shown in FIG. 3, the transfer layer 30 has a layered structure wherein the peeling layer 2, the protective layer 3, the receiving layer 50, and the adhesive layer 4 are provided in this order. The transfer layer 30 is not limited to the embodiment shown in Figure, and it can take any embodiment as long as it satisfies the condition that it contains the protective layer 3 and the receiving layer 3. For example, any optional layer(s) may be provided between the peeling layer 2 and the protective layer 3, between the protective layer 3 and the receiving layer 50, and/or on the receiving layer 50.

(Protective Layer)

The protective layer 3 which constitutes the transfer layer 30 contains the acrylic polyol resin having a glass transition temperature (Tg) of more than 80° C. as explained in the above mentioned protective layer of the first embodiment (the above mentioned acrylic polyol resin (A)), or the polyester polyurethane resin having a glass transition temperature (Tg) of not less than 50° C. as explained in the above mentioned protective layer of the second embodiment (the above mentioned "specific polyester polyurethane resin".

According to the intermediate transfer medium of the first embodiment having this protective layer, when a thermal transferred image is formed on the receiving layer 50, and then the transfer layer 30 including the thermal transfer image formed receiving layer 50 and the protective layer 3 is transferred onto an arbitrary transfer receiving article, it is possible to obtain a printed article where a high durability is imparted to the thermal transferred image. In addition, the foil tearing property of the protective layer 3 upon transferring the receiving layer 50 and the protective layer 3 to the transfer receiving article is also excellent. Further, in the case that the protective layer having the polyester polyurethane resin having a glass transition temperature (Tg) of not less than 50° C. is adopted, it is possible to impart both of the physical durability and the chemical durability concurrently to the transfer layer 30 which includes the protective layer.

The above mentioned effects brought by the intermediate transfer medium 100 of the present invention are owing to the same reasons with those for the protective layer 3 of the first embodiment, or the protective layer 3 of the second embodiment, of the protective layer transfer sheet 10 of the first embodiment of the present invention, and thus, the detailed description thereof will be omitted here. Therefore, in the intermediate transfer medium 100 of the first embodiment of the present invention, it is possible to use the protective layer of the first embodiment, or the protective layer of the second embodiment, which has been described in the explanation of the protective layer transfer sheet 10 of the first embodiment of the present invention, as-is. Here, in the intermediate transfer medium of the first embodiment of the present invention, since the receiving layer 50 provided on the protective layer 3 is directly, or via any optional layer(s) such as an adhesive layer indirectly, superposed on the transfer receiving article, the adhesiveness is not particularly necessary to the protective layer 3.

Alternatively, it is also possible to add the "component having release property from the substrate" to the protective layer 3 of the first embodiment, or the protective layer 3 of the second embodiment so as to form a protective layer which also carries the function of the peeling layer (peeling layer-cum-protective layer). Separately, the release property form the substrate can be secured by providing a separate layer, for instance, by providing a peeling layer 2 between the substrate 1 and the protective layer 3, as shown in FIG. 3. As for the peeling layer 2, it is possible to use the peeling layer 2 described in the above mentioned protective layer transfer sheet 10 of the present invention as it is, and thus, a detailed description thereof will be omitted here.

(Receiving Layer)

As shown in FIG. 3, on the protective layer 3, a receiving layer 50 is provided. The receiving layer is a layer which is included in the transfer layer 30. On the receiving layer, an image will be formed. Then, the receiving layer 50, on which the image have been thus formed, is transferred in conjunction with the protective layer 3, and the optionally provided peeling layer and the like, onto a transfer receiving article. As a result, a printed article is produced. Therefore, as a material for forming the receiving layer 50, it is possible to adopt any resin material which is known as the one that can easily receive thermally-transferable colorants such as subliming dyes or thermally-fusible inks. For example, polyolefin resins such as polypropylene; halogenated resins such as polyvinyl chloride and polyvinylidene chloride; vinyl resins such as polyvinyl acetate, vinyl chloride—vinyl acetate copolymer, ethylene—vinyl acetate copolymer and polyacrylic ester; polyester resins such as polyethylene terephthalate and polybutylene terephthalate; polystyrene resins; polyamide resins; copolymer type resins of an olefin such as ethylene or propylene and another vinyl polymer; ionomer or cellulose-based resins such as cellulose diastase; polycarbonate; etc., are exemplified. In particular, vinyl chloride resin, acryl-styrene resin or a polyester resin is preferred.

When the receiving layer 50 is transferred to the transfer receiving article via an adhesive layer, adhesiveness for the receiving layer 5 itself is not necessarily required. However, if the receiving layer 50 is transferred to the transfer receiving article without the adhesive layer, it is preferable that the receiving layer 50 comprises a resin material having adhesive property, such as a vinyl chloride-vinyl acetate copolymer.

The receiving layer 50 can be formed by dissolving or dispersing a material or plural materials selected from the above-mentioned materials, and optionally in combination with various additives, into an appropriate solvent such as water or an organic solvent in order to prepare a coating liquid for the receiving layer, coating thus prepared coating liquid for the receiving layer in accordance with a known procedure such as gravure printing method, screen printing method, or reverse-coating method using a gravure plate, etc., and then drying the coated film. The receiving layer 50 is usually about 1 g/m$^2$-10 g/m$^2$ in thickness in dried state.

When the receiving layer 50 does not have the adhesiveness, it is possible to provide an adhesive layer 4 on this receiving layer 50. The adhesive layer is an optional component in the intermediate transfer medium 100 of the present invention, and when a certain measure to satisfy the adhesion is taken on the transfer receiving article's side, the adhesive layer is not necessarily provided on the receiving layer 50. As the adhesive layer which is optionally provided on the receiving layer 50, the adhesive layer 4 as described above in the explanation for the protective layer transfer sheet 10 of the present invention can be used as-is. Thus, the detailed explanation thereof is omitted here.

(Back Face Layer)

Further, the back face layer 5 may be provided on the other surface of the substrate 1 as shown in FIG. 3. As the back face layer 5, it is possible to use the same back face layer 5 in the protective layer transfer sheet 10 of the first embodiment of the present invention as described above, and thus, a detailed description thereof will be omitted here.

<<Intermediate Transfer Medium of the Second Embodiment>>

Next, the intermediate transfer medium 100 in the second embodiment of the present invention will be described. The intermediate transfer medium 100 in the second embodiment of the present invention comprises a substrate 1 and a transfer layer 30 which is peelably provided on a surface of the substrate 1, and the transfer layer 30 comprises a peeling layer 2, a protective layer 3, and a receiving layer 50 which are layered in this order from the substrate. The substrate 1, the peeling layer 2, the protective layer 3 and the receiving layer 50 are essential components of the intermediate transfer medium 100 according to the second embodiment of the present invention. Incidentally, as shown in FIG. 3, the intermediate transfer medium 100 according to the second embodiment of the present invention may be provided with a back face layer which is located on another surface of the substrate 1. Further, it may be provided with an adhesive layer 4 which located on the receiving layer 50. Hereinafter, the components constituting the intermediate transfer medium 100 according to the second embodiment of the present invention will be described in detail. Here, the intermediate transfer medium of the second embodiment is different from the intermediate transfer medium of the first embodiment, in the point that the intermediate transfer medium of the second embodiment contains the peeling layer (A) described later as an essential layer.

(Substrate)

As the substrate 1, it is possible to use the same as the substrate 1 of the protective layer transfer sheet 10 of the second embodiment of the present invention, thus a detailed description thereof will be omitted here.

(Protective Layer)

The protective layer 3 which is included in the transfer layer 20 contains the acrylic polyol resin having a glass transition temperature (Tg) of not less than 50° C.

(Peeling Layer)

The peeling layer 2 which is included in the transfer layer 20 contains at least one selected from a group consisting of polyester resins, acrylic urethane resins, and epoxy resins. Namely, the transfer layer includes the peeling layer (A) as described above.

The above mentioned effects brought by the intermediate transfer medium 100 of the present invention are owing to the same reasons with those for the second embodiment of the present invention, and thus, the detailed description thereof will be omitted here. Therefore, in the intermediate transfer medium 100 of the present invention, it is possible to use the protective layer 3 and the peeling layer 2 as described in the explanation of the protective layer transfer sheet 10 of the second embodiment of the present invention can be used as-is. Here, in the present invention, since the receiving layer 50 provided on the protective layer 3 is directly, or via any optional layer (s) such as an adhesive layer indirectly, superposed on the transfer receiving article, the adhesiveness is not particularly necessary to the protective layer 3.

(Receiving Layer)

As the receiving layer, the receiving layer as described above in the explanation of the intermediate transfer medium of the first embodiment can be used as-is, and thus, the detailed description thereof is omitted here.

When the receiving layer 50 does not have adhesiveness, it is possible to provide an adhesive layer 4 on the receiving layer 50. The adhesive layer is an optional component in the intermediate transfer medium 100 of the second embodiment of the present invention. When a certain measure to satisfy the adhesion is taken on the transfer receiving article's side, the adhesive layer is not necessarily provided on the receiving layer 50. As the adhesive layer which is optionally provided on the receiving layer 50, the adhesive layer 4 as described above in the explanation for the protective layer transfer sheet 10 of the second embodiment of present invention can be used as-is. Thus, the detailed explanation thereof is omitted here.

(Back Face Layer)

Further, the back face layer 5 may be provided on the other surface of the substrate 1 as shown in FIG. 3. As the back face layer 5, it is possible to use the same back face layer 5 in the protective layer transfer sheet 10 of the second embodiment of the present invention as described above, and thus, a detailed description thereof will be omitted here.

(Image Forming Method)

With respect to a method for forming an image onto the receiving layer 50 by using the intermediate transfer medium of the present invention, there is no particular limitation, and it is possible to form it in accordance with any conventionally known thermal transfer method.

As the thermal transfer sheet to be used on the above mentioned image formation, it is possible to use any conventionally known thermal transfer sheet, for instance, which comprises a substrate such as polyester film, and a thermal transferable color material layer which is provided on one surface of the substrate, and a back face layer which is provided on the other surface of the substrate. Now, the thermal transfer sheet will be explained.

(Substrate of Thermal Transfer Sheet)

As the substrate of the thermal transfer sheet, it is not particularly limited, as long as it is the one which has a known certain degree of heat resistance and a known certain degree of strength, and it is possible to select one arbitrarily from materials known in the art. As such a substrate, for instance, a resin film, such as polyethylene terephthalate film, 1,4-polycyclohexylene dimethylene terephthalate film, polyethylene naphthalate film, polyphenylene sulfide film, polystyrene film, polypropylene film, polysulfone film, aramide film, polycarbonate film, polyvinyl alcohol film, cellulose derivatives such as cellophane and cellulose acetate, polyethylene film, polyvinyl chloride film, nylon film, polyimide film, ionomer film, etc.; and a paper such as condenser paper, paraffin paper, synthetic paper, etc.; nonwoven fabric; and a complex such as complex of paper or nonwoven fabric and resin, etc., can be enumerated.

Although the thickness of the substrate is not particularly limited, it is usually about 0.5-50 µm, and preferably, about 1.5-10 µm.

The substrate may undergo surface treatment in order to improve its adhesiveness to the adjacent layer. As the surface treatment, it is possible to apply any resin surface reforming technique known in the art, such as corona discharge treatment, flame treatment, ozone treatment, ultraviolet ray treatment, radiation treatment, roughening treatment, chemical agent's treatment, plasma treatment, grafting treatment, etc. These surface treatments may be applied singly or in combination of two or more kinds of them. In addition, if necessary, the one side or both sides of the substrate may be optionally provided with an under coating layer (primer layer).

(Thermal Transferable Color Material Layer)

When the thermal transfer sheet is a sublimation type thermal transfer sheet, sublimable dye-containing color material layers are formed as the thermal transferable color material layer. On the other hand, when the thermal transfer sheet is a heat-fusion type thermal transfer sheet, the color material layer comprises a heat-fusion composition which contains coloring agent, and becomes a color material layer containing heat-fusion ink. In addition, for instance, a color material layer containing a sublimable dye and another color material layer containing a heat-fusion type ink which comprises a heat-fusion type composition with a dye, may be provided on one continuous substrate as being frame sequentially.

As the sublimable dye, for instance, diarylmethane dyes; triarylmethane dyes; thiazole dyes; merocyanine dyes; pyrazolone dyes; methine dyes; indoaniline dyes; azomethine dyes such as acetophenone azomethine dyes, pyrazolo azomethine dyes, imidazol eazomethine dyes, imidazo azomethine dyes, and pyridone azomethine dyes; xanthene dyes; oxazine dyes; cyanostyrene dyes such as dicyanostyrene dyes and tricyanostyrene dyes; thiazine dyes; azine dyes; acridine dyes; benzeneazo dyes; azo dyes such as, pyridoneazo dyes, thiopheneazo dyes, isothiazoleazo dyes, pyrroleazo dyes, pyrazoleazo dyes, imidazoleazo dyes, thiadiazoleazo dyes, triazoleazo dyes, and disazo dyes; spiropyran dyes; indolinospiropyran dyes; fluoran dyes; rhodaminelactam dyes; naphthoquinone dyes; anthraquinone dyes; and quinophthalone dyes; etc., can be enumerated. More concretely, compounds which are exemplified in Japanese Patent Unexamined Publication JP HEI 7-149062 A (JP 1995-149062 A), and the like, can be enumerated. In the thermal transferable color material layer, it is preferable that the content of the sublimable dye is not less than 5% by weight and not more than 90% by weight, more preferably, not less than 10% by weight and not more than 70% by weight, on the basis of the total solid content of the thermal transferable color material layer. When the content of the sublimable dye is less than the above mentioned range, the print density may decrease in some cases, and when the content of the sublimable dye exceeds to the above mentioned ranges, the reservation property may decrease in some cases.

As the binder resin for supporting such a dye, for instance, cellulosic resins such as ethylcellulose, hydroxyethylcellulose, ethylhydroxycellose, hydroxypropylcellulose, methylcellulose, cellulose acetate, and cellulose tributyrate; vinyl resins such as polyvinylalcohol, polyvinyl acetate, polyvinylbutyral, polyvinylacetoacetal, and polyvinylpyrrolidone; acrylic resins such as poly(meth)acrylate and poly(meta)acrylamide; polyurethane resins, polyamide resins, polyester resins, and the like. Among them, cellulosic, vinyl, acrylic, urethane, and polyester resins are preferable from the points of heat resistance and dye-transfer efficiency.

The thermal transferable color material layer may contain optionally additives such as release agent, inorganic fine particles, organic fine particles, etc. Examples of such release agent include silicone oils, polyethylene waxes, phosphate esters, etc. As the silicone oils, straight silicone oils, and modified silicone oils and their hardened forms, etc., can be enumerated. The silicone oils may be reactive ones or non-reactive ones. Examples of such inorganic fine particles include carbon black, silica, molybdenum disulfide, etc. The modified silicone oils may be classified into the reactive silicone oils and the non-reactive silicone oils. As the reactive silicone oils, for instance, amino modified-, epoxy modified-, carboxy modified-, hydroxy modified-, methacryl modified-, mercapt modified-, phenol modified-, one terminal reactive-hetero functional group modified-, etc., may be enumerated. As the non-reactive silicone oils, for instance, polyether modified-, methylstyryl modified-, alkyl modified-, higher fatty acid ester modified-, hydrophilic special modified-, higher alkoxy modified-, fluorine modified-, etc., may be enumerated. As for adding amount of the silicone oil, it is preferable to be 0.1-15% by weight, and more desirably, 0.3-10% by weight, on the basis of weight of the binder. Examples of the organic fine particles as mentioned above include polyethylene waxes, etc.

The thermal transferable color material layer may be formed, for instance, by dissolving or dispersing the sublimable dye and the binder resin, and optionally, various additives if necessary, in a suitable solvent, to prepare a coating liquid for thermal transferable color material layer; coating the coating liquid on the substrate by a conventional coating method; and drying the coated liquid. As the conventional coating method, for instance, gravure printing, reverse roll coating using a gravure plate, roll coater, bar-coater, etc. may be enumerated. As the solvent, for instance, toluene, methyl ethyl ketone, ethanol, isopropyl alcohol, cyclohexanone, dimethylformamide (DMF), etc., may be enumerated.

There is no particular limitation for the thickness of the thermal transferable color material layer, and usually, the thickness may be in the range of 0.2 μm-0.5 μm.

(Back Face Layer of the Thermal Transfer Sheet)

In addition, for the purpose of improving the thermal resistance and giving the driving stability to the thermal head, a back face layer may be provided on the other surface of the substrate. As the back face layer 5, it is possible to use the same back face layer 5 in the protective layer transfer sheet 10 of the present invention as described above, and thus, a detailed description thereof will be omitted here.

EXAMPLES

Next, the present invention will be described more concretely with demonstrating examples and comparative examples. Hereinafter, unless otherwise specified, the expressions of "part(s)" and "%" mean those by weight. Further, "Tg" represents the glass transition temperature, "Mw" represents the weight average molecular weight, and "Mn" represents the number average molecular weight. Further, the unit of hydroxyl value is mg KOH/g.

Example 1

Using a polyethylene terephthalate film (manufactured by Toray, Industries, Inc., Lumirror) of 12 μm in thickness as a substrate, and coating a coating liquid for peeling layer having the following composition onto one side of the substrate so as to obtain a film thickness of 1.0 g/m² in dried state, and then drying, a peeling layer was formed. After that, coating a coating liquid for protective layer 1 having the following composition onto thus formed peeling layer so as to obtain a film thickness of 2.0 g/m² in dried state, and then drying, a protective layer was formed. Next, coating a coating liquid for receiving layer 1 having the following composition onto thus formed protective layer so as to obtain a film thickness of 1.0 g/m² in dried state, and then drying, a receiving layer was formed. Ultimately, the intermediate transfer medium of Example 1 was prepared. Herein, all the coatings of the coating liquid for peeling layer, the coating liquid for protective layer 1, and the coating liquid for receiving layer were performed in accordance with gravure coating.

<Coating Liquid for Peeling Layer>

| | |
|---|---|
| acrylic resin | 80 parts |
| (BR-87, manufactured by Mitsubishi Rayon Co., Ltd.) | |
| polyester resin | 5 parts |
| (Vylon 200, manufactured by TOYOBO Co., Ltd.) | |
| polyethylene wax | 5 parts |
| (Polywax 1000, manufactured by TOYO ADL Corp.) | |
| UV absorbing acrylic resin | 25 parts |
| (PUVA-50M-40TM, manufactured by Otsuka Chemical Co., Ltd.) | |
| toluene | 192.5 parts |
| methyl ethyl ketone | 192.5 parts |

<Coating Liquid for Protective Layer 1>

| | |
|---|---|
| Acrylic polyol resin (solid content: 36.5%, Tg: 102° C., Mw: 55000, hydroxyl value (solid): 30.1, —OH: 11) (6-kW-700, manufactured by Taisei Fine Chemicals Co., Ltd.) | 100 parts |
| methyl ethyl ketone | 82.5 parts |

<Coating Liquid for Receiving Layer>

| | |
|---|---|
| vinyl chloride - vinyl acetate copolymer | 95 parts |
| (CNL, manufactured by Nissin Chemical Industry Co., Ltd.) | |
| epoxy modified silicone oil | 5 parts |
| (KP-1800U, manufactured by Shin-Etsu Chemical Co., Ltd.) | |
| toluene | 200 parts |
| methyl ethyl kentone | 200 parts |

Example 2

The same procedure as described in Example 1 was repeated, except for replacing the coating liquid for protective layer 1 with a coating liquid for protective layer 2 having the following composition, in order to prepare an intermediate transfer medium of Example 2.

<Coating Liquid for Protective Layer 2>

| | |
|---|---|
| molar equivalent ratio (—NCO/—OH): 0.5 acrylic polyol resin (solid content: 36.5%, Tg: 102° C., Mw: 55000, hydroxyl value (solid): 30.1, —OH: 11) (6 kW-700, manufactured by Taisei Fine Chemicals Co., Ltd.) | 100 parts |
| isocyanate type curing agent (solid content: 75% —NCO: 11.5%) (TAKENATE D110N (XDI type), manufactured by Mitsui Chemicals Co., Ltd.) | 3.6 parts |
| Methyl ethyl ketone | 92 parts |

Example 3

The same procedure as described in Example 1 was repeated, except for replacing the coating liquid for protective layer 1 with a coating liquid for protective layer 3 having the following composition, in order to prepare an intermediate transfer medium of Example 3.

<Coating Liquid for Protective Layer 3>

| | |
|---|---|
| molar equivalent ratio (—NCO/—OH): 1.0 acrylic polyol resin (solid content: 36.5%, Tg: 102° C., Mw: 55000, hydroxyl value (solid): 30.1, —OH: 11) (6 kW-700, manufactured by Taisei Fine Chemicals Co., Ltd.) | 100 parts |
| isocyanate type curing agent (solid content: 75% —NCO: 11.5%) (TAKENATE Dl1ON (XDI type), manufactured by Mitsui Chemicals) | 7.2 parts |
| Methyl ethyl ketone | 100 parts |

Example 4

The same procedure as described in Example 1 was repeated, except for replacing the coating liquid for protective layer 1 with a coating liquid for protective layer 4 having the following composition, in order to prepare an intermediate transfer medium of Example 4.

<Coating Liquid for Protective Layer 4>

| | |
|---|---|
| molar equivalent ratio (—NCO/—OH): 2.0 acrylic polyol resin (solid content: 36.5%, Tg: 102° C., Mw: 55000, hydroxyl value (solid): 30.1, —OH: 11) (6kW-700, manufactured by Taisei Fine Chemicals Co., Ltd.) | 100 parts |
| isocyanate type curing agent (solid content: 75% —NCO: 11.5%) (TAKENATE D110N (XDI type), manufactured by Mitsui Chemicals) | 14.4 parts |
| Methyl ethyl ketone | 120 parts |

Example 5

The same procedure as described in Example 1 was repeated, except for replacing the coating liquid for protective layer 1 with a coating liquid for protective layer 5 having the following composition, in order to prepare an intermediate transfer medium of Example 5.

<Coating Liquid for Protective Layer 5>

| | |
|---|---|
| molar equivalent ratio (—NCO/—OH): 1.0 acrylic polyol resin (solid content: 36.5%, Tg: 102° C., Mw: 55000, hydroxyl value (solid): 30.1, —OH: 11) (6kW-700, manufactured by Taisei Fine Chemicals Co., Ltd.) | 100 parts |
| isocyanate type curing agent (solid content: 75% —NCO: 15.5%) (DURANATE 21S-75E (HDI type), manufactured by Asahi Kasei Corporation) | 5.3 parts |
| Methyl ethyl ketone | 95 parts |

Example 6

The same procedure as described in Example 1 was repeated, except for replacing the coating liquid for protective layer 1 with a coating liquid for protective layer 6 having the following composition, in order to prepare an intermediate transfer medium of Example 6.

<Coating Liquid for Protective Layer 6>

| | |
|---|---|
| molar equivalent ratio (—NCO/—OH): 1.0 | 100 parts |
| acrylic polyol resin (solid content: 36.5%, Tg: 102° C., Mw: 55000, hydroxyl value (solid): 30.1, —OH: 11) (6kW-700, manufactured by Taisei Fine Chemicals Co., Ltd.) | |
| isocyanate type curing agent (solid content: 75% —NCO: 10.5%) (TAKENATE D140N (IPDI type), manufactured by Mitsui Chemicals Co., Ltd.) | 7.8 parts |
| Methyl ethyl ketone | 100 parts |

Example 7

The same procedure as described in Example 1 was repeated, except for replacing the coating liquid for protective layer 1 with a coating liquid for protective layer 7 having the following composition, in order to prepare an intermediate transfer medium of Example 7.

<Coating Liquid for Protective Layer 7>

| | |
|---|---|
| acrylic polyol resin (solid content: 36.5%, Tg: 102° C., Mw: 55000, hydroxyl value (solid): 30.1, —OH: 11) (6kW-700, manufactured by Taisei Fine Chemicals Co., Ltd.) | 100 parts |
| titanium chelating agent (solid content: 65 percent) (ORGATIX TC-401, manufactured by Matsumoto Fine Chemical Co., Ltd.) | 1.1 parts |
| Methyl ethyl ketone | 85 parts |

Example 8

The same procedure as described in Example 1 was repeated, except for replacing the coating liquid for protective layer 1 with a coating liquid for protective layer 8 having the following composition, in order to prepare an intermediate transfer medium of Example 8.

<Coating Liquid for Protective Layer 8>

| | |
|---|---|
| acrylic polyol resin (solid content: 36.5%, Tg: 102° C., Mw: 55000, hydroxyl value (solid): 30.1, —OH: 11) (6kW-700, manufactured by Taisei Fine Chemicals Co., Ltd.) | 100 parts |
| aluminum chelating agent (solid content: 76%) (Aluminum chelate D, manufactured by Kawaken Fine Chemicals Co., Ltd.) | 3 parts |
| Methyl ethyl ketone | 90 parts |

Example 9

The same procedure as described in Example 1 was repeated, except for omitting the formation of peeling layer between the substrate and the protective layer and replacing the coating liquid for protective layer 1 with a coating liquid for peeling layer-cum-protective layer 1 having the following composition, in order to prepare an intermediate transfer medium of Example 9. The coating liquid for peeling layer-cum-protective layer 1 was coated so as to obtain a film thickness of 3.0 g/m² in dried state.

<Coating Liquid for Peeling Layer-Cum-Protective Layer 1>

| | |
|---|---|
| molar equivalent ratio (—NCO/—OH): 1.0 | 189 parts |
| acrylic polyol resin (solid content: 36.5%, Tg: 102° C., Mw: 55000, hydroxyl value (solid): 30.1, —OH: 11) (6kW-700, manufactured by Taisei Fine Chemicals Co., Ltd.) | |
| isocyanate type curing agent (solid content: 75% —NCO: 11.5%) (TAKENATE D110N (XDI type), manufactured by Mitsui Chemicals) | 14.7 parts |
| polyester resin (Vylon 200, manufactured by TOYOBO Co., Ltd.) | 5 parts |
| polyethylene wax (Polywax 1000, manufactured by TOYO ADL Corp.) | 5 parts |
| UV absorbing acrylic resin (PUVA-50M-40TM, manufactured by Otsuka Chemical Co., Ltd.) | 25 parts |
| toluene | 130 parts |
| methyl ethyl ketone | 130 parts |

Example 10

The same procedure as described in Example 1 was repeated, except for replacing the coating liquid for protective layer 1 with a coating liquid for protective layer 9 having the following composition, in order to prepare an intermediate transfer medium of Example 10.

<Coating Liquid for Protective Layer 9>

| | |
|---|---|
| molar equivalent ratio (—NCO/—OH): 1.0 | 100 parts |
| acrylic polyol resin (solid content: 45%, Tg: 97° C., Mw: 23000, hydroxyl value (solid): 60, —OH: 27) (Q-164, manufactured by Mitsui Chemicals Co., Ltd.) | |
| isocyanate type curing agent (solid content: 75% —NCO: 11.5%) (TAKENATE D110N (XDI type), manufactured by Mitsui Chemicals) | 17.6 parts |
| methyl ethyl ketone | 170 parts. |

Example 11

The same procedure as described in Example 1 was repeated, except for replacing the coating liquid for protective layer 1 with a coating liquid for protective layer 10 having the following composition, in order to prepare an intermediate transfer medium of Example 10.

<Coating Liquid for Protective Layer 10>

| | |
|---|---|
| molar equivalent ratio (—NCO/—OH): 1.0 | 100 parts |
| acrylic polyol resin (solid content: 50%, Tg: 87° C., Mw: >15000, hydroxyl value (solid): 35, —OH: 17.5) (A-814, manufactured by DIC Corporation) | |
| isocyanate type curing agent (solid content: 75% —NCO: 11.5%) (TAKENATE D110N (XDI type), manufactured by Mitsui Chemicals) | 11.4 parts |
| methyl ethyl ketone | 180 parts |

Example 12

The same procedure as described in Example 1 was repeated, except for replacing the coating liquid for protective layer 1 with a coating liquid for protective layer 11 having the following composition, in order to prepare an intermediate transfer medium of Example 12.

<Coating Liquid for Protective Layer 11>

| | |
|---|---|
| molar equivalent ratio (—NCO/—OH): 1.0 acrylic polyol resin (solid content: 60%, Tg: 85° C., Mw: 5000, hydroxyl value (solid): 115, —OH: 69) (LH-635, manufactured by Toray Fine Chemicals Co., Ltd.) | 100 parts |
| isocyanate type curing agent (solid content: 75% —NCO: 11.5%) (TAKENATE D110N (XDI type), manufactured by Mitsui Chemicals) | 22 parts |
| methyl ethyl ketone | 260 parts. |

Example 13

The same procedure as described in Example 1 was repeated, except for replacing the coating liquid for protective layer 1 with a coating liquid for protective layer 12 having the following composition, in order to prepare an intermediate transfer medium of Example 13.

<Coating Liquid for Protective Layer 12>

| | |
|---|---|
| molar equivalent ratio (—NCO/—OH): 1.0 cured acrylic polyol/UV absorbing acrylic resin ≈ 7/3 acrylic polyol resin (solid content: 36.5%, Tg: 102° C., Mw: 55000, hydroxyl value (solid): 30.1, —OH: 11) (6kW-700, manufactured by Taisei Fine Chemicals Co., Ltd.) | 70 parts |
| isocyanate type curing agent (solid content: 75% —NCO: 11.5%) (TAKENATE D110N (XDI type), manufactured by Mitsui Chemicals) | 5.46 parts |
| UV absorbing acrylic resin (PUVA-50M-TM, manufactured by Otuska Chemical Co., Ltd., solid content 40%) | 31.8 parts |
| toluene | 50 parts |
| methyl ethyl ketone | 50 parts. |

Example 14

The same procedure as described in Example 1 was repeated, except for replacing the coating liquid for protective layer 1 with a coating liquid for protective layer 13 having the following composition, in order to prepare an intermediate transfer medium of Example 14.

<Coating Liquid for Protective Layer 13>

| | |
|---|---|
| molar equivalent ratio (—NCO/—OH): 1.0 cured acrylic polyol/UV absorbing acrylic resin ≈ 4/6 acrylic polyol resin (solid content: 36.5%, Tg: 102° C., Mw: 55000, hydroxyl value (solid): 30.1, —OH: 11) (6kW-700, manufactured by Taisei Fine Chemicals Co., Ltd.) | 40 parts |
| isocyanate type curing agent (solid content: 75% —NCO: 11.5%) (TAKENATE D110N (XDI type), manufactured by Mitsui Chemicals) | 3.12 parts |
| UV absorbing acrylic resin (PUVA-50M-TM, manufactured by Otuska Chemical Co., Ltd., solid content 40%) | 63.5 parts |
| toluene | 50 parts |
| methyl ethyl ketone | 50 parts |

Example 15

The same procedure as described in Example 1 was repeated, except for replacing the coating liquid for protective layer 1 with a coating liquid for protective layer 14 having the following composition, in order to prepare an intermediate transfer medium of Example 15

<Coating Liquid for Protective Layer 14>

| | |
|---|---|
| molar equivalent ratio (—NCO/—OH): 1.0 cured acrylic polyol/UV absorbing acrylic resin ≈ 85/15 acrylic polyol resin (solid content: 36.5%, Tg: 102° C., Mw: 55000, hydroxyl value (solid): 30.1, —OH: 11) (6kW-700, manufactured by Taisei Fine Chemicals Co., Ltd.) | 85 parts |
| isocyanate type curing agent (solid content: 75% —NCO: 11.5%) (TAKENATE D110N (XDI type), manufactured by Mitsui Chemicals) | 6.63 parts |
| UV absorbing acrylic resin (PUVA-50M-TM, manufactured by Otuska Chemical Co., Ltd., solid content 40%) | 16.4 parts |
| toluene | 50 parts |
| methyl ethyl ketone | 50 parts |

Example 16

The same procedure as described in Example 1 was repeated, except for replacing the coating liquid for protective layer 1 with the coating liquid for protective layer 3 having the above mentioned composition, and replacing the coating liquid for peeling layer 1 with the coating liquid for peeling layer 2 having the following composition, in order to prepare an intermediate transfer medium of Example 16.

<Coating Liquid for Peeling Layer 2>

| | |
|---|---|
| acrylic resin (Tg: 105° C., Mw: 25000) (BR-87, manufactured by Mitsubishi Rayon Co., Ltd.) | 80 parts |
| isocyanate type curing agent (solid content: 75% —NCO: 11.5%) (TAKENATE D110N (XDI type), manufactured by Mitsui Chemicals Co., Ltd.) | 4 parts |
| polyethylene wax (Polywax 1000, manufactured by TOYO ADL Corp.) | 5 parts |
| UV absorbing acrylic resin (PUVA-50M-40TM, manufactured by Otsuka Chemical Co., Ltd.) | 25 parts |
| toluene | 192.5 parts |
| methyl ethyl ketone | 192.5 parts |

Example 17

The same procedure as described in Example 1 was repeated, except for replacing the coating liquid for protective layer 1 with the coating liquid for protective layer 3 having the above mentioned composition, and replacing the coating liquid for peeling layer 1 with the coating liquid for peeling layer 3 having the following composition, in order to prepare an intermediate transfer medium of Example 17.

<Coating Liquid for Peeling Layer 3>

| | |
|---|---|
| acrylic polyol resin (solid content: 40%, Tg: 97° C., Mw: 23000, hydroxyl value (solid): 60, —OH: 24) (Q-167-40, manufactured by Mitsui Chemicals Co., Ltd.) | 187.5 parts |
| isocyanate type curing agent (solid content: 75% —NCO: 11.5%) (TAKENATE D110N (XDI type), manufactured by Mitsui Chemicals Co., Ltd.) | 13.3 parts |
| polyethylene wax (Polywax 1000, manufactured by TOYO ADL Corp.) | 5 parts |
| UV absorbing acrylic resin (PUVA-50M-40TM, manufactured by Otsuka Chemical Co., Ltd.) | 25 parts |
| toluene | 192.5 parts |
| methyl ethyl ketone | 192.5 parts |

Example 18

The same procedure as described in Example 1 was repeated, except for replacing the coating liquid for protective layer 1 with the coating liquid for protective layer 3 having the above mentioned composition, and replacing the coating liquid for peeling layer 1 with the coating liquid for peeling layer 4 having the following composition, in order to prepare an intermediate transfer medium of Example 18.

<Coating Liquid for Peeling Layer 4>

| | |
|---|---|
| molar equivalent ratio (-epoxy group/-amino group): 1.0 amino-modified acrylic resin (solid content: 40%, Tg: 75° C., Mw: 53000) (LK-730, manufactured by Toray Fine Chemicals Co., Ltd.) | 200 parts |
| epoxy curing agent (Denacol EX-612, manufactured by Nagase ChemteX Corporation) | 8.5 parts |
| polyethylene wax (Polywax 1000, manufactured by TOYO ADL Corp.) | 5 parts |
| UV absorbing acrylic resin (PUVA-50M-40TM, manufactured by Otsuka Chemical Co., Ltd.) | 10 parts |
| toluene/isobutanol = 1/1 mixed solvent | 200 parts |

Example 19

The same procedure as described in Example 1 was repeated, except for replacing the coating liquid for protective layer 1 with the coating liquid for protective layer 3 having the above mentioned composition, and replacing the coating liquid for peeling layer 1 with the coating liquid for peeling layer 5 having the following composition, in order to prepare an intermediate transfer medium of Example 19.

<Coating Liquid for Peeling Layer 5>

| | |
|---|---|
| phenoxy resin (epoxy resin) (PKHA, manufactured by Tomoe Engineering Co., Ltd.) | 80 parts |
| polyester resin (Vylon 200, manufactured by TOYOBO Co., Ltd.) | 5 parts |
| polyethylene wax (Polywax 1000, manufactured by TOYO ADL Corp.) | 5 parts |
| UV absorbing acrylic resin (PUVA-50M-40TM, manufactured by Otsuka Chemical Co., Ltd.) | 25 parts |
| methyl ethyl ketone | 385 parts |

Example 20

The same procedure as described in Example 1 was repeated, except for replacing the coating liquid for protective layer 1 with a coating liquid for protective layer 15 having the following composition, in order to prepare an intermediate transfer medium of Example 20.

<Coating Liquid for Protective Layer 20>

| | |
|---|---|
| molar equivalent ratio (—NCO/—OH): 3.0 acrylic polyol resin (solid content: 36.5%, Tg: 102° C., Mw: 55000, hydroxyl value (solid): 30.1, —OH: 11) (6kW-700, manufactured by Taisei Fine Chemicals Co., Ltd.) | 100 parts |
| isocyanate type curing agent (solid content: 75% —NCO: 11.5%) (TAKENATE D110N (XDI type), manufactured by Mitsui Chemicals) | 21.6 parts |
| methyl ethyl ketone | 100 parts |

Comparative Example 1

The same procedure as described in Example 1 was repeated, except for replacing the coating liquid for protective layer 1 with a coating liquid for protective layer A having the following composition, in order to prepare an intermediate transfer medium of Comparative Example 1.

<Coating Liquid for Protective Layer A>

| | |
|---|---|
| molar equivalent ratio (—NCO/—OH): 1.0 acrylic polyol resin (solid content: 50%, Tg: 48° C., Mw: 40000, hydroxyl value (solid): 100, —OH: 50) (A-801-P, manufactured by DIC Corporation) | 100 parts |
| isocyanate type curing agent (solid content: 75% —NCO: 11.5%) (TAKENATE D110N (XDI type), manufactured by Mitsui Chemicals) | 32.5 parts |
| methyl ethyl ketone | 240 parts |

Comparative Example 2

The same procedure as described in Example 1 was repeated, except for replacing the coating liquid for protective layer 1 with a coating liquid for protective layer B having the following composition, in order to prepare an intermediate transfer medium of Comparative Example 2.

<Coating Liquid for Protective Layer B>

| | |
|---|---|
| molar equivalent ratio (—NCO/—OH): 0.5 acrylic polyol resin (solid content: 50%, Tg: 48° C., Mw: 40000, hydroxyl value (solid): 100, —OH: 50) (A-801-P, manufactured by DIC Corporation) | 100 parts |
| isocyanate type curing agent (solid content: 75% —NCO: 11.5%) (TAKENATE D110N (XDI type), manufactured by Mitsui Chemicals) | 16.3 parts |
| methyl ethyl ketone | 190 parts |

Comparative Example 3

The same procedure as described in Example 1 was repeated, except for omitting the formation of peeling layer between the substrate and the protective layer in order to prepare an intermediate transfer medium of Comparative Example 3.

Comparative Example 4

The same procedure as described in Example 1 was repeated, except for replacing the coating liquid for protective layer 1 with a coating liquid for protective layer C having the following composition, and omitting the formation of peeling layer between the substrate and the protective layer in order to prepare an intermediate transfer medium of Comparative Example 4.
<Coating Liquid for Protective Layer C>

| | |
|---|---|
| molar equivalent ratio (—NCO/—OH): 1.0 | 100 parts |
| acrylic polyol resin (solid content: 46%, Tg: 75° C., Mw: 29000, hydroxyl value (solid): 61, —OH: 28.06) (LH-613, manufactured by Toray Fine Chemicals Co., Ltd.) | |
| isocyanate type curing agent (solid content: 75% —NCO: 11.5%) (TAKENATE D110N (XDI type), manufactured by Mitsui Chemicals) | 18.3 parts |
| methyl ethyl ketone | 180 parts |

Comparative Example 5

The same procedure as described in Example 1 was repeated, except for replacing the coating liquid for protective layer 1 with a coating liquid for protective layer D having the following composition, in order to prepare an intermediate transfer medium of Comparative Example 5.
<Coating Liquid for Protective Layer D>

| | |
|---|---|
| polyester resin (solid content: 100%) (Vylon 200, manufactured by TOYOBO Co., Ltd.) | 20 parts |
| methyl ethyl ketone | 240 parts |

Comparative Example 6

The same procedure as described in Example 1 was repeated, except for replacing the coating liquid for protective layer 1 with a coating liquid for protective layer E having the following composition, in order to prepare an intermediate transfer medium of Comparative Example 6.
<Coating Liquid for Protective Layer E>

| | |
|---|---|
| acrylic resin (solid content: 100%, Mw: 95000) (Vylonal BR-80, manufactured by Mitsubishi Rayon Co., Ltd.) | 20 parts |
| methyl ethyl ketone | 80 parts |

Comparative Example 7

The same procedure as described in Example 1 was repeated, except for replacing the coating liquid for protective layer 1 with a coating liquid for protective layer F having the following composition, in order to prepare an intermediate transfer medium of Comparative Example 7.
Change the coating liquid for a protective layer on the protective layer coating solution having the following composition F except that, in the same manner as in example 1 to obtain an intermediate transfer medium of Comparative Example 7.
<Coating Liquid for Protective Layer F>

| | |
|---|---|
| acrylic resin (solid content: 100%, Mw: 25000) (Vylonal BR-87, manufactured by Mitsubishi Rayon Co., Ltd.) | 20 parts |
| methyl ethyl ketone | 80 parts |

(Formation of Printed Article)

Using HDP-600 printer (manufactured by HID), and thermal transfer sheet prepared by the following procedure, a black solid image was printed onto each individual receiving layer of the intermediate transfer media of Examples and Comparative Examples under the default condition. Then, using the same printer, the receiving layer, the protective layer and the peeling layer (except for Example 9, and Comparative Examples 3 and 6 which do not have the peeling layer) after the formation of black solid image of each individual intermediate transfer medium was transferred to a card made of polyvinyl chloride (manufactured by Dai Nippon Printing Co., Ltd) under the retransfer condition of 175° C., 2 sec/inch. Thus, printed articles of Examples 1-20 and Comparative examples 1-7 were obtained.

(Preparation of Thermal Transfer Sheet)

As a substrate, polyethylene terephthalate film which underwent easy-adhesive treatment in advance, and has 4.5 µm in thickness was used. On this substrate, a liquid for forming back face layer having the following composition was coated so as to obtain a thickness of 0.8 g/m$^2$ in the dried state and then the coated liquid was dried to form a back face layer. Then, on another surface of the substrate, a liquid for forming yellow dye layer, a liquid for forming magenta dye layer, and a liquid for forming cyan dye layer were coated so as to obtain each individual thickness of 0.6 g/m$^2$ in the dried state, and then the coated liquids were dried through a repeated face-by-face operation for each color in this order in order to form the respective dye layers. Ultimately, a thermal transfer sheet was prepared.
<Coating Liquid for Back Face Layer>

| | |
|---|---|
| Polyvinyl butyral resin (S-LEC BX-1, manufactured by Sekisui Chemical Co., Ltd.) | 2.0 parts |
| Polyisocyanate (BURNOCK D750, manufactured by DIC Corporation) | 9.2 parts |
| Phosphoric ester type surfactant (PLY SURF A208N, manufactured by Dai-ichi Kogyo Seiyaku, Co., Ltd.) | 1.3 parts |
| Talc (MICRO ACE P-3, manufactured by Nippon Talc Co., Ltd.) | 0.3 parts |
| toluene | 43.6 parts |
| methyl ethyl ketone | 43.6 parts |

<Coating Liquid for Yellow Dye Layer>

| | |
|---|---|
| Dye represented by the following formula | 4.0 parts |
| polyvinyl acetal resin (S-LEC KS-5, manufactured by Sekisui Chemical Co., Ltd.) | 3.5 parts |
| Polyethylene wax | 0.1 part |
| Methyl ethyl ketone | 45.0 parts |
| Toluene | 45.0 parts |

[Chem. 2]

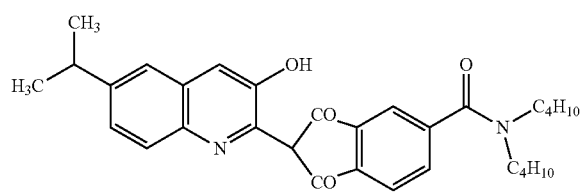

<Coating Liquid for Magenta Dye Layer>

| | |
|---|---|
| Disperse dye (Disperse Red 60) | 1.5 parts |
| Disperse dye (Disperse Violet 26) | 2.0 parts |
| polyvinyl acetal resin | 4.5 parts |
| (S-LEC KS-5, manufactured by Sekisui Chemical Co., Ltd.) | |
| Polyethylene wax | 0.1 part |
| Methyl ethyl ketone | 45.0 parts |
| Toluene | 45.0 parts |

<Coating Liquid for Cyan Dye Layer>

| | |
|---|---|
| Disperse dye (Solvent Blue 63) | 4.0 parts |
| polyvinyl acetal resin | 3.5 parts |
| (S-LEC KS-5, manufactured by Sekisui Chemical Co., Ltd.) | |
| Polyethylene wax | 0.1 part |
| Methyl ethyl ketone | 45.0 parts |
| Toluene | 45.0 parts |

(Evaluation for Transferability)

On the formation of each individual printed articles of the Examples and the Comparative Examples, whether the receiving layer and the protective layer can be transferred onto the polyvinyl chloride card (manufactured by Dai Nippon Printing Co., Ltd) or not was observed visually. The evaluation for this transferability was done under the following evaluation criteria. The evaluation test results are shown in table 1.
<Evaluation Criteria>
○: Both of the receiving layer and the protective layer could be transferred with no problem.
Δ: Small non-transferred parts of the receiving layer and the protective layer were observed, which may cause a problem in use.
x: Considerably large non-transferred parts of the receiving layer and the protective layer were observed, which certainly cause problems in use.

(Foil Tearing Evaluation)

As the evaluation of the foil tearing of Examples and Comparative examples, blooming of each print was observed visually, and the evaluation of this test was done under the following evaluation criteria. The evaluation test results are shown in table 1. Herein, the blooming means the length of the transfer layer which protruded from the boundary between the non-transferred region and the transferred region of the transfer layer, as the starting point, to the non-transferred region side.
<Evaluation Criteria>
◎: There was no visible blooming.
○: The blooming was not more than 0.3 mm.
Δ: Although a slight blooming (0.3 mm-1.0 mm) was observed in the image, but it was within the level of causing no problem in use.
x: Considerable blooming (not less than 1.0 mm) was observed.

(Evaluation of Abrasion Resistance)

Each printed article of Examples and Comparative Examples underwent wearing by using a wear ring CS-10F under a load of 500 gf and was run for 250 revolutions. After wearing, the condition of the surface was observed visually, and evaluation of this test was done under the following evaluation criteria.

The evaluation test results are shown in table 1.
<Evaluation Criteria>
◎: Scratch was not observed on the image at all.
○: Although a few scratches were observed on the printed article, but it was within the level of causing no problem in use.
Δ: Scratches were observed on the printed article, and it reached the level of causing problem in use.
x: A considerable amount of scratches were observed on the printed article.

TABLE 1

| | Transferability | Foil tearing | Abrasion resistance |
|---|---|---|---|
| Example 1 | ○ | ◎ | ◎ |
| Example 2 | ○ | ◎ | ◎ |
| Example 3 | ○ | ○ | ◎ |
| Example 4 | ○ | ○ | ◎ |
| Example 5 | ○ | ○ | ◎ |
| Example 6 | ○ | ○ | ◎ |
| Example 7 | ○ | ○ | ◎ |
| Example 8 | ○ | ○ | ◎ |
| Example 9 | ○ | ○ | ◎ |
| Example 10 | ○ | ○ | ◎ |
| Example 11 | ○ | ○ | ◎ |
| Example 12 | ○ | ○ | |
| Example 13 | ○ | ○ | ◎ |
| Example 14 | ○ | ○ | |
| Example 15 | ○ | ○ | ◎ |
| Example 16 | ○ | ○ | ◎ |
| Example 17 | ○ | ○ | ◎ |
| Example 18 | ○ | ○ | ◎ |
| Example 19 | ○ | ○ | ◎ |
| Example 20 | ○ | Δ | ◎ |
| Comparative example 1 | Δ | ○ | X |
| Comparative example 2 | X | ○ | X |
| Comparative example 3 | X | ○ | X |
| Comparative example 4 | Δ | ○ | X |
| Comparative example 5 | ○ | X | ○ |
| Comparative example 6 | ○ | X | X |
| Comparative example 7 | ○ | ○ | X |

As is apparent from table 1, the glass transition temperature (Tg) more than 80. Degree. C. acrylic polyol resin and glass transition temperature (Tg) in the curing agent is acrylic polyol resin is more than. Degree. C. in the intermediate transfer medium of the embodiment is provided with a protective layer containing hardening by hardening type acrylic polyol resin, and at the time of the transfer foil cutting can be durable enough to meet. On the other hand, the intermediate transfer medium of comparative example of the present invention is not satisfying the following piece of foil, and the protective layer of the durability or the other, or you can satisfy the requirements of both the results reveal the superiority of the present invention.

Then, in order to evaluate the superiority obtained by using the cured acrylic polyol resin of the present invention and optimizing the weight average molecular weight (Mw) of the present invention, the following evaluation of the plasticizer resistance and solvent resistance were made.

(Evaluation of Plasticizer Resistance)

Onto each printed article of Examples and Comparative examples, plasticizer (DOP) was added. Then, the printed article was covered with a PET film, and it was kept for 8 hours at 40° C. After the time elapsed, the surface condition of the printed article was observed visually. Evaluation was done under the following evaluation criteria. The evaluation results are shown in Table 2.

<Evaluation Criteria>

◉: No damage was observed in the image.
○: Although a little damage was observed in the image, but it was within the level of causing no problem in use.
Δ: Damages were observed on the printed article, and it reached the level of causing problem in use.
x: Damages which certainly causes problems in use was observed in the image.

(Evaluation of Solvent Resistance)

Each printed article of Examples and Comparative examples underwent 30 times of reciprocating motions of a methyl ethyl ketone (MEK) soaked cotton swab. After the predetermined times of reciprocating motions, the surface condition of the image was observed visually. Evaluation was done under the following evaluation criteria. The evaluation results are shown in Table 1.

<Evaluation Criteria>

◉: No damage was observed in the image.
○: Although a little damage was observed in the image, but it was within the level of causing no problem in use.
Δ: Damages were observed on the printed article, and it reached the level of causing problem in use.
x: Damages which certainly causes problems in use was observed in the image.

TABLE 2

|  | Plasticizer resistance | Solvent resistance |
|---|---|---|
| Example 1 | ○ | ○ |
| Example 2 | ◉ | ◉ |
| Example 3 | ◉ | ◉ |
| Example 4 | ◉ | ◉ |
| Example 5 | ◉ | ◉ |
| Example 6 | ◉ | ◉ |
| Example 7 | ◉ | ◉ |
| Example 8 | ◉ | ◉ |
| Example 9 | ◉ | ◉ |
| Example 10 | ◉ | ◉ |
| Example 11 | ◉ | ○ |
| Example 12 | Δ | X |
| Example 13 | ○ | Δ |
| Example 14 | Δ | X |
| Example 15 | ○ | ○ |
| Example 16 | ◉ | ◉ |
| Example 17 | ◉ | ◉ |
| Example 18 | ◉ | ◉ |
| Example 19 | ◉ | ◉ |
| Example 20 | ○ | ○ |
| Comparative example 1 | X | X |
| Comparative example 2 | X | X |
| Comparative example 3 | X | X |
| Comparative example 4 | X | X |
| Comparative example 5 | X | X |
| Comparative example 6 | ○ | X |
| Comparative example 7 | ○ | X |

As clear from table 2, with respect to the intermediate transfer media of Example 2-11, which included the cured acrylic polyol resin in which acrylic polyol resin having a glass transition temperature (Tg) of more than 80° C. and a weight average molecular weight of not less than 8000 and not more than 70000 had been cured by a curing agent, the results excelled in the foil tearing property of the protective layer and the durability as well as the plasticizer resistance and the solvent resistance were obtained. Further, it was confirmed that the plasticizer resistance and the solvent resistance tended to decrease, as the content of the acrylic polyol resin having a weight average molecular weight of not less than 8000 and not more than 70000, and/or the content of the cured acrylic polyol resin obtained by curing the above mentioned acrylic polyol resin with the curing agent is lower than 80% by weight.

Example 21

The same procedure as described in Example 1 was repeated, except for replacing the coating liquid for protective layer 1 with the coating liquid for protective layer (1-1) having the following composition in order to prepare an intermediate transfer medium of Example 21.

<Coating Liquid for Protective Layer (1-1)>

| polyester based polyurethane resin (Tg: 61° C., solid content 20 ± 1%) (AP-30F, manufactured by DIC Corporation) | 90 parts |
|---|---|
| Poly vinyl alcohol resin (saponification degree: 98-99%, 20% aqueous solution) (PVA-105, manufactured by Kuraray Co., Ltd.) | 10 parts |
| water/ethanol = 1/1 | 50 parts |

Example 22

The same procedure as described in Example 1 was repeated, except for replacing the coating liquid for protective layer 1 with the coating liquid for protective layer (1-2) having the following composition in order to prepare an intermediate transfer medium of Example 22.

<Coating Liquid for Protective Layer (1-2)>

| polyester based polyurethane resin (Tg: 61° C., solid content 20 ± 1%) (AP-30F, manufactured by DIC Corporation) | 75 parts |
|---|---|
| Poly vinyl alcohol resin (saponification degree: 98-99%, 20% aqueous solution) (PVA-105, manufactured by Kuraray Co., Ltd.) | 25 parts |
| water/ethanol = 1/1 | 50 parts |

Example 23

The same procedure as described in Example 1 was repeated, except for replacing the coating liquid for protective layer 1 with the coating liquid for protective layer (1-3) having the following composition in order to prepare an intermediate transfer medium of Example 23.

<Coating Liquid for Protective Layer (1-3)>

| polyester based polyurethane resin (Tg: 61° C., solid content 20 ± 1%) (AP-30F, manufactured by DIC Corporation) | 60 parts |
|---|---|
| Poly vinyl alcohol resin (saponification degree: 98-99%, 20% aqueous solution) (PVA-105, manufactured by Kuraray Co., Ltd.) | 40 parts |
| water/ethanol = 1/1 | 50 parts |

Example 24

The same procedure as described in Example 1 was repeated, except for replacing the coating liquid for protective layer 1 with the coating liquid for protective layer (1-4) having the following composition in order to prepare an intermediate transfer medium of Example 24.

<Coating Liquid for Protective Layer (1-4)>

| | |
|---|---|
| polyester based polyurethane resin (Tg: 61° C., solid content 20 ± 1%) (AP-30F, manufactured by DIC Corporation) | 65 parts |
| Poly vinyl alcohol resin (saponification degree: 98-99%, 20% aqueous solution) (PVA-105, manufactured by Kuraray Co., Ltd.) | 25 parts |
| silica sol (particle diameter: 4-6 nm) (solid content: 10%) (NXS, manufactured by Nissan Chemical Industries, Ltd.) | 20 parts |
| water/ethanol = 1/1 | 50 parts |

Example 25

The same procedure as described in Example 1 was repeated, except for replacing the coating liquid for protective layer 1 with the coating liquid for protective layer (1-5) having the following composition in order to prepare an intermediate transfer medium of Example 25.

<Coating Liquid for Protective Layer (1-5)>

| | |
|---|---|
| polyester based polyurethane resin (Tg: 61° C., solid content 20 ± 1%) (AP-30F, manufactured by DIC Corporation) | 50 parts |
| Poly vinyl alcohol resin (saponification degree: 98-99%, 20% aqueous solution) (PVA-105, manufactured by Kuraray Co., Ltd.) | 25 parts |
| silica sol (particle diameter: 4-6 nm) (solid content: 10%) (NXS, manufactured by Nissan Chemical Industries, Ltd.) | 50 parts |
| water/ethanol = 1/1 | 50 parts |

Example 26

The same procedure as described in Example 25 was repeated, except for omitting the formation of the peeling layer in order to prepare an intermediate transfer medium of Example 26.

Example 27

The same procedure as described in Example 1 was repeated, except for replacing the coating liquid for protective layer 1 with the coating liquid for protective layer (1-6) having the following composition in order to prepare an intermediate transfer medium of Example 27.

<Coating Liquid for Protective Layer (1-6)>

| | |
|---|---|
| polyester based polyurethane resin (Tg: 61° C., solid content 20 ± 1%) (AP-30F, manufactured by DIC Corporation) | 65 parts |
| Poly vinyl alcohol resin (saponification degree: 86.5-89%, 20% aqueous solution) (PVA-205, manufactured by Kuraray Co., Ltd.) | 25 parts |
| silica sol (particle diameter: 4-6 nm) (solid content: 10%) (NXS, manufactured by Nissan Chemical Industries, Ltd.) | 20 parts |
| water/ethanol = 1/1 | 50 parts |

Example 28

The same procedure as described in Example 1 was repeated, except for replacing the coating liquid for protective layer 1 with the coating liquid for protective layer (1-7) having the following composition in order to prepare an intermediate transfer medium of Example 28.

<Coating Liquid for Protective Layer (1-7)>

| | |
|---|---|
| polyester based polyurethane resin (Tg: 61° C., solid content 20 ± 1%) (AP-30F, manufactured by DIC Corporation) | 65 parts |
| Poly vinyl alcohol resin (saponification degree: 98-99%, 20% aqueous solution) (PVA-110, manufactured by Kuraray Co., Ltd.) | 25 parts |
| silica sol (particle diameter: 4-6 nm) (solid content: 10%) (NXS, manufactured by Nissan Chemical Industries, Ltd.) | 20 parts |
| water/ethanol = 1/1 | 50 parts |

Example 29

The same procedure as described in Example 1 was repeated, except for replacing the coating liquid for protective layer 1 with the coating liquid for protective layer (1-8) having the following composition in order to prepare an intermediate transfer medium of Example 29.

<Coating Liquid for Protective Layer (1-8)>

| | |
|---|---|
| polyester based polyurethane resin (Tg: 57° C., solid content 30 ± 1%) (HW-350, manufactured by DIC Corporation) | 100 parts |
| water/ethanol = 1/1 | 100 parts |

Example 30

The same procedure as described in Example 1 was repeated, except for replacing the coating liquid for protective layer 1 with the coating liquid for protective layer (1-9) having the following composition in order to prepare an intermediate transfer medium of Example 30.

<Coating Liquid for Protective Layer (1-9)>

| | |
|---|---|
| polyester based polyurethane resin (Tg: 57° C., solid content 30 ± 1%) (HW-350, manufactured by DIC Corporation) | 48.5 parts |
| Poly vinyl alcohol resin (saponification degree: 98-99%, 20% aqueous solution) (PVA-105, manufactured by Kuraray Co., Ltd.) | 25 parts |
| water/ethanol = 1/1 | 81.5 parts |

Example 31

The same procedure as described in Example 1 was repeated, except for replacing the coating liquid for peeling layer 1 with the coating liquid for peeling layer 2 having the above mentioned composition, and replacing the coating liquid for protective layer 1 with the coating liquid for protective layer (1-4) having the above mentioned composition, in order to prepare an intermediate transfer medium of Example 31.

Example 32

The same procedure as described in Example 1 was repeated, except for replacing the coating liquid for peeling layer 1 with the coating liquid for peeling layer 3 having the above mentioned composition, and replacing the coating liquid for protective layer 1 with the coating liquid for protective layer (1-4) having the above mentioned composition, in order to prepare an intermediate transfer medium of Example 32.

Example 33

The same procedure as described in Example 1 was repeated, except for replacing the coating liquid for peeling layer 1 with the coating liquid for peeling layer 4 having the above mentioned composition, and replacing the coating liquid for protective layer 1 with the coating liquid for protective layer (1-4) having the above mentioned composition, in order to prepare an intermediate transfer medium of Example 33.

Example 34

The same procedure as described in Example 1 was repeated, except for replacing the coating liquid for peeling layer 1 with the coating liquid for peeling layer 5 having the above mentioned composition, and replacing the coating liquid for protective layer 1 with the coating liquid for protective layer (1-4) having the above mentioned composition, in order to prepare an intermediate transfer medium of Example 31.

Comparative Example 8

The same procedure as described in Example 1 was repeated, except for replacing the coating liquid for protective layer 1 with a coating liquid for protective layer (1-A) having the following composition, in order to prepare an intermediate transfer medium of Comparative Example 8.
<Coating Liquid for Protective Layer (1-A)>

| | |
|---|---|
| polyester resin (Vylon 600, manufactured by TOYOBO Co., Ltd.) | 20 parts |
| Methyl ethyl ketone | 80 parts |

Comparative Example 9

The same procedure as described in Example 1 was repeated, except for replacing the coating liquid for protective layer 1 with a coating liquid for protective layer (1-B) having the following composition, in order to prepare an intermediate transfer medium of Comparative Example 9.
<Coating Liquid for Protective Layer (1-B)>

| | |
|---|---|
| polyester based polyurethane resin (Tg: 49° C., solid content 22-23%) (AP-40F, manufactured by DIC Corporation) | 100 parts |
| water/ethanol = 1/1 | 100 parts |

Comparative Example 10

The same procedure as described in Example 1 was repeated, except for replacing the coating liquid for protective layer 1 with a coating liquid for protective layer (1-C) having the following composition, in order to prepare an intermediate transfer medium of Comparative Example 10.

<Coating Liquid for Protective Layer (1-C)>

| | |
|---|---|
| polyester based polyurethane resin (Tg: 49° C., solid content 22-23%) (AP-40F, manufactured by DIC Corporation) | 40 parts |
| Poly vinyl alcohol resin (saponification degree: 98-99%, 20% aqueous solution) (PVA-105, manufactured by Kuraray Co., Ltd.) | 20 parts |
| water/ethanol = 1/1 | 100 parts |

Comparative Example 11

The same procedure as described in Example 1 was repeated, except for replacing the coating liquid for protective layer 1 with a coating liquid for protective layer (1-D) having the following composition, in order to prepare an intermediate transfer medium of Comparative Example 11.
<Coating Liquid for Protective Layer (1-D)>

| | |
|---|---|
| polyether based polyurethane resin (Tg: 101° C., solid content 35 ± 1%) (SF-130, manufactured by DIC Corporation) | 100 parts |
| methyl ethyl ketone | 100 parts |

(Formation of Printed Article)

Using HDP-600 printer (manufactured by HID), and the thermal transfer sheet prepared by the above mentioned procedure, a black solid image was printed onto each individual receiving layer of the intermediate transfer media of Examples and Comparative Examples under the default condition. Then, using the same printer, the receiving layer, the protective layer and the peeling layer after the formation of black solid image of each individual intermediate transfer medium was transferred to a card made of polyvinyl chloride (manufactured by Dai Nippon Printing Co., Ltd) under the retransfer condition of 175° C., 2 sec/inch. Thus, printed articles of Examples 21-34 and Comparative examples 8-11 were obtained.
(Evaluation for Transferability)

On the formation of each individual printed articles of Examples 21-34 and the Comparative Examples 8-11, the transferability of the transfer layer which included the peeling layer, the protective layer and the receiving layer was evaluated under the following evaluation criteria. The evaluation test results are shown in table 3.
<Evaluation Criteria>

○: Both of the receiving layer and the protective layer could be transferred with no problem.

Δ: Small non-transferred parts of the receiving layer and the protective layer were observed, which may cause a problem in use.

x: Considerably large non-transferred parts of the receiving layer and the protective layer were observed, which certainly cause problems in use.

(Evaluation of Physical Durability)

Each printed article of Examples and Comparative Examples underwent wearing by using a wear ring CS-10F under a load of 500 gf and was run for 250 revolutions. After wearing, the condition of the surface was observed visually, and evaluation of this test was done under the following evaluation criteria. The evaluation test results are shown in table 3.
<Evaluation Criteria>

◉: Scratch was not observed on the image at all.

○: Although a few scratches were observed on the printed article, but it was within the level of causing no problem in use.

Δ: Scratches were observed on the printed article, and it reached the level of causing problem in use.
x: S considerable amount of scratches were observed on the printed article.
(Evaluation of Plasticizer Resistance)
Polyvinyl chloride sheet(ARUTRON #430, manufactured by Mitsubishi Plastics, Inc.) was cut into 5 cm×5 cm in size, and the cut sheets were superposed on the printed matters of Examples and Comparative Examples, respectively, the superposed materials were kept for 12 hours under an environment of 82° C. while applying a load of 1750 g onto the individual superposed materials. After the time elapsed, test pieces were observed by visually whether the image of the printed matter migrated to the polyvinyl chloride sheet or not. Evaluation of plasticizer resistance was done under the following evaluation criteria. The evaluation results are shown in Table 3.
<Evaluation Criteria>
○: The image did not migrate from of the printed matter to the vinyl chloride sheet at all.
Δ: Although the image migrated to the vinyl chloride sheet very slightly, the image on the colors of printed matter did not fade.
x: The image migrated to the vinyl chloride sheet considerably, and the colors of the image of the printed matter also faded considerably.
(Evaluation of Solvent Resistance)
Each printed article of Examples and Comparative examples was immersed in ethanol for 24 hours. After the immersion in ethanol, the printed article was visually observed to determine whether the image of the printed article was deteriorated or not. Evaluation was done under the following evaluation criteria. The evaluation results are shown in Table 3.
<Evaluation Criteria>
○: No deterioration was observed in the image.
Δ: The image was turned to matt slightly.
x: The image was turned to matt considerably.
(Foil Tearing Evaluation)
As the evaluation of the foil tearing of Examples and Comparative examples, blooming of each print was observed visually, and the evaluation of this test was done under the following evaluation criteria. The evaluation test results are shown in table 3. Herein, the blooming means the length of the transfer layer which protruded from the boundary between the non-transferred region and the transferred region of the transfer layer, as the starting point, to the non-transferred region side.
<Evaluation Criteria>
◎: There was no visible blooming.
○: The blooming was not more than 0.3 mm.
Δ: Although a slight blooming (0.3 mm-1.0 mm) was observed in the image, but it was within the level of causing no problem in use.
x: considerable blooming (not less than 1.0 mm) was observed.

TABLE 3

| | Transferability | Foil tearing | Durability | | |
|---|---|---|---|---|---|
| | | | Physical durability | Chemical durability | |
| | | | | Plasticizer resistance | Solvent resistance |
| Example 21 | ○ | ○ | ◎ | ○ | ○ |
| Example 22 | ○ | ○ | ◎ | ○ | ○ |
| Example 23 | ○ | Δ | ◎ | ○ | ○ |
| Example 24 | ○ | ◎ | ◎ | ○ | ○ |
| Example 25 | ○ | ◎ | ○ | ○ | ○ |
| Example 26 | ○ | ◎ | ○ | ○ | ○ |
| Example 27 | ○ | ◎ | ◎ | ○ | ○ |
| Example 28 | ○ | Δ | ◎ | ○ | ○ |
| Example 29 | ○ | ○ | ◎ | Δ | ○ |
| Example 30 | ○ | ◎ | ◎ | ○ | ○ |
| Example 31 | ○ | ◎ | ◎ | ○ | ○ |
| Example 32 | ○ | ◎ | ◎ | ○ | ○ |
| Example 33 | ○ | ◎ | ◎ | ○ | ○ |
| Example 34 | ○ | ◎ | ◎ | ○ | ○ |
| Comparative example 8 | ○ | ○ | ○ | X | Δ |
| Comparative example 9 | ○ | ○ | X | X | X |
| Comparative example 10 | ○ | ○ | X | X | X |
| Comparative example 11 | ○ | X | X | X | Δ |

Example 35

The same procedure as described in Example 1 was repeated, except for replacing the coating liquid for protective layer 1 with the coating liquid for protective layer (2-1) having the following composition in order to prepare an intermediate transfer medium of Example 35.
<Coating Liquid for Protective Layer (2-1)>

| | |
|---|---|
| molar equivalent ratio (—NCO/—OH): 1.0 acrylic polyol resin (solid content: 40%, Tg: 97° C., Mw: 23000, hydroxyl value (solid): 60, —OH: 24) (Q-167-40, manufactured by Mitsui Chemicals Co., Ltd.) | 100 parts |
| isocyanate type curing agent (solid content: 75% - NCO: 11.5%) (TAKENATE D110N (XDI type), manufactured by Mitsui Chemicals Co., Ltd.) | 17.6 parts |
| methyl ethyl ketone | 170 parts |

Example 36

The same procedure as described in Example 36 was repeated, except for replacing the coating liquid for peeling layer 1 with the coating liquid for peeling layer 2 having the above mentioned composition, and replacing the coating liquid for protective layer 1 with the coating liquid for protective layer (2-1) having the above mentioned composition, in order to prepare an intermediate transfer medium of Example 36.

Example 37

The same procedure as described in Example 36 was repeated, except for replacing the coating liquid for peeling layer 1 with the coating liquid for peeling layer 3 having the above mentioned composition, and replacing the coating liquid for protective layer 1 with the coating liquid for protective layer (2-1) having the above mentioned composition, in order to prepare an intermediate transfer medium of Example 37.

Example 38

The same procedure as described in Example 36 was repeated, except for replacing the coating liquid for peeling layer 1 with the coating liquid for peeling layer 4 having the above mentioned composition, and replacing the coating liquid for protective layer 1 with the coating liquid for protective layer (2-1) having the above mentioned composition, in order to prepare an intermediate transfer medium of Example 38.

Example 39

The same procedure as described in Example 36 was repeated, except for replacing the coating liquid for peeling layer 1 with the coating liquid for peeling layer 5 having the above mentioned composition, and replacing the coating liquid for protective layer 1 with the coating liquid for protective layer (2-1) having the above mentioned composition, in order to prepare an intermediate transfer medium of Example 39.

Example 40

The same procedure as described in Example 1 was repeated, except for replacing the coating liquid for protective layer 1 with the coating liquid for protective layer (2-2) having the following composition in order to prepare an intermediate transfer medium of Example 40.
<Coating Liquid for Protective Layer (2-2)>

| | |
|---|---|
| molar equivalent ratio (—NCO/—OH): 0.5 acrylic polyol resin (solid content: 40%, Tg: 97° C., Mw: 23000, hydroxyl value (solid): 60, —OH: 24) (Q-167-40, manufactured by Mitsui Chemicals Co., Ltd.) | 100 parts |
| isocyanate type curing agent (solid content: 75% - NCO: 11.5%) (TAKENATE D110N (XDI type), manufactured by Mitsui Chemicals Co., Ltd.) | 8.8 parts |
| toluene | 192.5 parts |
| methyl ethyl ketone | 192.5 parts |

Example 41

The same procedure as described in Example 1 was repeated, except for replacing the coating liquid for protective layer 1 with the coating liquid for protective layer (2-3) having the following composition in order to prepare an intermediate transfer medium of Example 41.
<Coating Liquid for Protective Layer (2-3)>

| | |
|---|---|
| molar equivalent ratio (—NCO/—OH): 2.0 acrylic polyol resin (solid content: 40%, Tg: 97° C., Mw: 23000, hydroxyl value (solid): 60, —OH: 24) (Q-167-40, manufactured by Mitsui Chemicals Co., Ltd.) | 100 parts |
| isocyanate type curing agent (solid content: 75% —NCO: 11.5%) (TAKENATE D110N (XDI type), manufactured by Mitsui Chemicals Co., Ltd.) | 35.2 parts |
| toluene | 192.5 parts |
| methyl ethyl ketone | 192.5 parts |

Example 42

The same procedure as described in Example 1 was repeated, except for replacing the coating liquid for protective layer 1 with the coating liquid for protective layer (2-4) having the following composition in order to prepare an intermediate transfer medium of Example 42.
<Coating Liquid for Protective Layer (2-4)>

| | |
|---|---|
| molar equivalent ratio (—NCO/—OH): 1.0 acrylic polyol resin (solid content: 40%, Tg: 97° C., Mw: 23000, hydroxyl value (solid): 60, —OH: 24) (Q-167-40, manufactured by Mitsui Chemicals Co., Ltd.) | 100 parts |
| isocyanate type curing agent (solid content: 75% —NCO: 15.5%) (DURANATE 21S-75E (HDI type), manufactured by Asahi Kasei Corporation) | 11.9 parts |
| methyl ethyl ketone | 95 parts |

Example 43

The same procedure as described in Example 1 was repeated, except for replacing the coating liquid for protective layer 1 with the coating liquid for protective layer (2-5) having the following composition in order to prepare an intermediate transfer medium of Example 43.
<Coating Liquid for Protective Layer (2-5)>

| | |
|---|---|
| molar equivalent ratio (—NCO/—OH): 1.0 acrylic polyol resin (solid content: 40%, Tg: 97° C., Mw: 23000, hydroxyl value (solid): 60, —OH: 24) (Q-167-40, manufactured by Mitsui Chemicals Co., Ltd.) | 100 parts |
| isocyanate type curing agent (solid content: 75% —NCO: 10.5%) (TAKENATE D140N (IPDI type), manufactured by Mitsui Chemicals Co., Ltd.) | 17.1 parts |
| methyl ethyl ketone | 95 parts |

Example 44

The same procedure as described in Example 1 was repeated, except for replacing the coating liquid for protective layer 1 with the coating liquid for protective layer (2-6) having the following composition in order to prepare an intermediate transfer medium of Example 44.
<Coating Liquid for Protective Layer (2-6)>

| | |
|---|---|
| molar equivalent ratio (—NCO/—OH): 1.0 acrylic polyol resin (solid content: 40%, Tg: 97° C., Mw: 23000, hydroxyl value (solid): 60, —OH: 24) (Q-167-40, manufactured by Mitsui Chemicals Co., Ltd.) | 95 parts |
| isocyanate type curing agent (solid content: 75% —NCO: 11.5%) (TAKENATE D110N (XDI type), manufactured by Mitsui Chemicals) | 16.7 parts |
| UV absorbing agent (TINUBIN900, manufactured by Ciba-Geigy Japan Limited) | 5 parts |
| methyl ethyl ketone | 95 parts |

Example 45

The same procedure as described in Example 1 was repeated, except for replacing the coating liquid for protective layer 1 with the coating liquid for protective layer (2-7) having the following composition in order to prepare an intermediate transfer medium of Example 45.

<Coating Liquid for Protective Layer (2-7)>

| | |
|---|---|
| molar equivalent ratio (—NCO/—OH): 1.0 | 100 parts |
| acrylic polyol resin (solid content: 40%, Tg: 70° C., hydroxyl value (solid): 52.5, —OH: 21) | |
| (UV-G137, manufactured by Nippon Shokubai Co., Ltd.) | |
| isocyanate type curing agent (solid content: 75% —NCO: 11.5%) | 13.7 parts |
| (TAKENATE D110N (XDI type), manufactured by Mitsui Chemicals) | |
| methyl ethyl ketone | 95 parts |

Example 46

The same procedure as described in Example 1 was repeated, except for replacing the coating liquid for protective layer 1 with the coating liquid for protective layer (2-8) having the following composition in order to prepare an intermediate transfer medium of Example 46.

<Coating Liquid for Protective Layer (2-8)>

| | |
|---|---|
| molar equivalent ratio (—NCO/—OH): 1.0 | 100 parts |
| acrylic polyol resin (solid content: 46%, Tg: 75° C., Mw: 29000, hydroxyl value (solid): 61, —OH: 28.06) | |
| (LH-613, manufactured by Toray Fine Chemicals Co., Ltd.) | |
| isocyanate type curing agent (solid content: 75% —NCO: 11.5%) | 18.3 parts |
| (TAKENATE D110N (XDI type), manufactured by Mitsui Chemicals) | |
| methyl ethyl ketone | 95 parts |

Example 47

The same procedure as described in Example 1 was repeated, except for replacing the coating liquid for protective layer 1 with the coating liquid for protective layer (2-9) having the following composition in order to prepare an intermediate transfer medium of Example 47.

<Coating Liquid for Protective Layer (2-9)>

| | |
|---|---|
| molar equivalent ratio (—NCO/—OH): 1.0 | 95 parts |
| acrylic polyol resin (solid content: 46%, Tg: 75° C., Mw: 29000, hydroxyl value (solid): 61, —OH: 28.06) | |
| (LH-613, manufactured by Toray Fine Chemicals Co., Ltd.) | |
| isocyanate type curing agent (solid content: 75% —NCO: 11.5%) | 17.4 parts |
| (TAKENATE D110N (XDI type), manufactured by Mitsui Chemicals) | |
| UV absorbing agent | 5 parts |
| (TINUBIN900, manufactured by Ciba-Geigy Japan Limited) | |
| methyl ethyl ketone | 95 parts |

Example 48

The same procedure as described in Example 1 was repeated, except for replacing the coating liquid for protective layer 1 with the coating liquid for protective layer (2-10) having the following composition in order to prepare an intermediate transfer medium of Example 48.

<Coating Liquid for Protective Layer (2-10)>

| | |
|---|---|
| molar equivalent ratio (—NCO/—OH): 1.0 | 100 parts |
| acrylic polyol resin (solid content: 50%, Tg: 63° C., Mw: 31000, hydroxyl value (solid): 25.9, —OH: 12.95) | |
| (LK-723, manufactured by Toray Fine Chemicals Co., Ltd.) | |
| isocyanate type curing agent (solid content: 75% —NCO: 11.5%) | 8.43 parts |
| (TAKENATE D110N (XDI type), manufactured by Mitsui Chemicals) | |
| methyl ethyl ketone | 95 parts |

Example 49

The same procedure as described in Example 1 was repeated, except for replacing the coating liquid for protective layer 1 with the coating liquid for protective layer (2-11) having the following composition in order to prepare an intermediate transfer medium of Example 49.

<Coating Liquid for Protective Layer (2-11)>

| | |
|---|---|
| molar equivalent ratio (—NCO/—OH): 1.0 | 100 parts |
| acrylic polyol resin (solid content: 55%, Tg: 53° C., Mw: 26600, hydroxyl value (solid): 72.7, —OH: 40) | |
| (WZU-591, manufactured by DIC Corporation) | |
| isocyanate type curing agent (solid content: 75% —NCO: 11.5%) | 28.5 parts |
| (TAKENATE D110N (XDI type), manufactured by Mitsui Chemicals) | |
| methyl ethyl ketone | 95 parts |

Example 50

The same procedure as described in Example 1 was repeated, except for replacing the coating liquid for protective layer 1 with the coating liquid for protective layer (2-12) having the following composition in order to prepare an intermediate transfer medium of Example 50.

<Coating Liquid for Protective Layer (2-12)>

| | |
|---|---|
| acrylic polyol resin (solid content: 55%, Tg : 53° C., Mw: 26600, hydroxyl value (solid): 72.7, —OH: 40) | 100 parts |
| (WZU-591, manufactured by DIC Corporation) | |
| methyl ethyl ketone | 95 parts |

Comparative Example 12

The same procedure as described in Example 1 was repeated, except for replacing the coating liquid for peeling layer 1 with the coating liquid for peeling layer A having the following composition, and replacing the coating liquid for protective layer 1 with the coating liquid for protective layer (2-8) having the above mentioned composition, in order to prepare an intermediate transfer medium of Comparative Example 12.

<Coating Liquid for Peeling Layer A>

| | |
|---|---|
| acrylic resin (Tg: 105° C., Mw: 25000) | 85 parts |
| (BR-87, manufactured by Mitsubishi Rayon Co., Ltd.) | |
| polyethylene wax | 5 parts |
| (Polywax 1000, manufactured by TOYO ADL Corp.) | |
| UV absorbing acrylic resin | 25 parts |
| (PUVA-50M-40TM, manufactured by Otsuka Chemical Co., Ltd., solid content: 40%) | |
| toluene | 192.5 parts |
| methyl ethyl ketone | 192.5 parts |

Comparative Example 13

The same procedure as described in Example 1 was repeated, except for replacing the coating liquid for protective layer 1 with the coating liquid for protective layer (2-A) having the following composition, in order to prepare an intermediate transfer medium of Comparative Example 13.
<Coating Liquid for Protective Layer (2-A)>

| | |
|---|---|
| acrylic polyol resin (solid content: 54%, Tg: 31° C., Mw: 20000, hydroxyl value (solid): 51, —OH: 27.54) (LH-681, manufactured by Toray Fine Chemicals Co., Ltd.) | 100 parts |
| isocyanate type curing agent (solid content: 75% —NCO: 11.5%) (TAKENATE D110N (XDI type), manufactured by Mitsui Chemicals) | 19.6 parts |
| methyl ethyl ketone | 95 parts |

Comparative Example 14

The same procedure as described in Example 1 was repeated, except for replacing the coating liquid for protective layer 1 with the coating liquid for protective layer (2-B) having the following composition, in order to prepare an intermediate transfer medium of Comparative Example 14.
<Coating Liquid for Protective Layer (2-B)>

| | |
|---|---|
| polyester resin (solid content: 100%) (Vylon 200, manufactured by TOYOBO Co., Ltd.) | 18 parts |
| UV absorbing agent (TINUBIN900, manufactured by Ciba-Geigy Japan Limited) | 2 parts |
| methyl ethyl ketone | 80 parts |

Comparative Example 15

The same procedure as described in Example 1 was repeated, except for replacing the coating liquid for protective layer 1 with the coating liquid for protective layer (2-C) having the following composition, in order to prepare an intermediate transfer medium of Comparative Example 15.
<Coating Liquid for Protective Layer (2-C)>

| | |
|---|---|
| acrylic resin (Tg: 105° C., Mw: 25000) (BR-87, manufactured by Mitsubishi Rayon Co., Ltd.) | 18 parts |
| UV absorbing agent (TINUBIN900, manufactured by Ciba-Geigy Japan Limited) | 2 parts |
| methyl ethyl ketone | 80 parts |

Comparative Example 16

The same procedure as described in Example 1 was repeated, except for omitting the formation of the peeling layer, and replacing the coating liquid for protective layer 1 with the coating liquid for protective layer (2-11) having the above mentioned composition, in order to prepare an intermediate transfer medium of Comparative Example 16.
(Formation of Printed Article)

Using HDP-600 printer (manufactured by HID), and the thermal transfer sheet prepared by the above mentioned procedure, a black solid image was printed onto each individual receiving layer of the intermediate transfer media of Examples and Comparative Examples under the default condition. Then, using the same printer, the receiving layer, the protective layer and the peeling layer after the formation of black solid image of each individual intermediate transfer medium was transferred to a card made of polyvinyl chloride (manufactured by Dai Nippon Printing Co., Ltd) under the retransfer condition of 175° C., 2 sec/inch. Thus, printed articles of Examples 35-50 and Comparative examples 12-16 were obtained.
(Evaluation for Transferability)

On the formation of each individual printed articles of Examples 35-50 and Comparative examples 12-16, the transferability of the transfer layer which included the peeling layer, the protective layer and the receiving layer was evaluated under the following evaluation criteria. The evaluation test results are shown in table 4.
<Evaluation Criteria>

○: Both of the receiving layer and the protective layer could be transferred with no problem.

Δ: Small non-transferred parts of the receiving layer and the protective layer were observed, which may cause a problem in use.

x: Considerably large non-transferred parts of the receiving layer and the protective layer were observed, which certainly cause problems in use.
(Foil Tearing Evaluation)

As the evaluation of the foil tearing of Examples and Comparative examples, blooming of each print was observed visually, and the evaluation of this test was done under the following evaluation criteria. The evaluation test results are shown in table 4. Herein, the blooming means the length of the transfer layer which protruded from the boundary between the non-transferred region and the transferred region of the transfer layer, as the starting point, to the non-transferred region side.
<Evaluation Criteria>

◉: There was no visible blooming.

○: The blooming was not more than 0.3 mm.

Δ: Although a slight blooming (0.3 mm-1.0 mm) was observed in the image, but it was within the level of causing no problem in use.

x: Considerable blooming (not less than 1.0 mm) was observed.
(Evaluation of Abrasion Resistance)

Each printed article of Examples and Comparative Examples underwent wearing by using a wear ring CS-10F under a load of 500 gf and was run for 250 revolutions. After wearing, the condition of the surface was observed visually, and evaluation of this test was done under the following evaluation criteria. The evaluation test results are shown in table 4.
<Evaluation Criteria>

◉: Scratch was not observed on the image at all.

○: Although a few scratches were observed on the printed article, but it was within the level of causing no problem in use.

Δ: Scratches were observed on the printed article, and it reached the level of causing problem in use.

x: A considerable amount of scratches were observed on the printed article.
(Evaluation of Plasticizer Resistance)

Onto each printed article of Examples and Comparative examples, plasticizer (DOP) was added. Then, the printed article was covered with a PET film, and it was kept for 8 hours at 40° C. After the time elapsed, the surface condition of the printed article was observed visually. Evaluation was done under the following evaluation criteria. The evaluation results are shown in Table 4.

<Evaluation Criteria>

◎: No damage was observed in the image.

○: Although a little damage was observed in the image, but it was within the level of causing no problem in use.

Δ: Damages were observed on the printed article, and it reached the level of causing problem in use.

x: Damages which certainly causes problems in use was observed in the image.

(Evaluation of Solvent Resistance)

Each printed article of Examples and Comparative examples underwent 30 times of reciprocating motions of a methyl ethyl ketone (MEK) soaked cotton swab. After the predetermined times of reciprocating motions, the surface condition of the image was observed visually. Evaluation was done under the following evaluation criteria. The evaluation results are shown in Table 4.

<Evaluation Criteria>

◎: No damage was observed in the image.

○: Although a little damage was observed in the image, but it was within the level of causing no problem in use.

Δ: Damages were observed on the printed article, and it reached the level of causing problem in use.

x: Damages which certainly causes problems in use was observed in the image.

TABLE 4

|  | Trans-ferability | Foil tearing | Abrasion resistance | Plasticizer resistance | Solvent resistance |
|---|---|---|---|---|---|
| Example 35 | ○ | ○ | ◎ | ◎ | ◎ |
| Example 36 | ○ | ○ | ◎ | ◎ | ◎ |
| Example 37 | ○ | Δ | ◎ | ◎ | ◎ |
| Example 38 | ○ | ○ | ◎ | ◎ | ◎ |
| Example 39 | ○ | ○ | ◎ | ◎ | ◎ |
| Example 40 | ○ | ◎ | ◎ | ◎ | ◎ |
| Example 41 | ○ | ○ | ◎ | ◎ | ◎ |
| Example 42 | ○ | ○ | ◎ | ◎ | ◎ |
| Example 43 | ○ | ○ | ◎ | ◎ | ◎ |
| Example 44 | ○ | ○ | ◎ | ◎ | ◎ |
| Example 45 | ○ | ○ | ○ | ○ | ◎ |
| Example 46 | ○ | ○ | ○ | ◎ | ◎ |
| Example 47 | ○ | ○ | ○ | ○ | ◎ |
| Example 48 | ○ | ○ | ○ | ○ | ◎ |
| Example 49 | ○ | ○ | ○ | ○ | ○ |
| Example 50 | ○ | ◎ | Δ | ○ | ◎ |
| Comparative example 12 | ○ | X | ○ | ◎ | ◎ |
| Comparative example 13 | ○ | ○ | X | X | X |
| Comparative example 14 | ○ | Δ | ○ | X | X |
| Comparative example 15 | ○ | ○ | X | X | X |
| Comparative example 16 | X | X | ○ | ○ | ○ |

EXPLANATION OF NUMERALS

10 . . . protective layer transfer sheet
1 . . . substrate
2 . . . peeling layer
3 . . . protective layer
4 . . . adhesive layer
5 . . . back face layer
20 . . . transfer layer
100 . . . intermediate transfer medium
30 . . . transfer layer
50 . . . receiving layer

The invention claimed is:

1. A protective layer transfer sheet comprising:
a substrate and a transfer layer peelably provided on a surface of the substrate;
the transfer layer including a peeling layer and a protective layer, layered in this order from the substrate;
the protective layer including an acrylic polyol resin having a glass transition temperature (Tg) of more than 80° C. having a weight average molecular weight (Mw) in a range of not less than 8000 and not more than 70000; and
the peeling layer including at least one selected from a group consisting of polyester resins, acrylic urethane resins, and epoxy resins.

2. A protective layer transfer sheet comprising:
a substrate and a transfer layer peelably provided on a surface of the substrate;
the transfer layer including a peeling layer and a protective layer, layered in this order from the substrate;
the protective layer including an acrylic polyol resin having a glass transition temperature (Tg) of more than 80° C., and the acrylic polyol resin being cured by a curing agent; and
the peeling layer including at least one selected from a group consisting of polyester resins, acrylic urethane resins, and epoxy resins.

3. The protective layer transfer sheet according to claim 2, wherein the curing agent is an isocyanate type curing agent selected from a group consisting of XDI type, HMDI type and IPDI type.

4. A protective layer transfer sheet comprising:
a substrate and a transfer layer peelably provided on a surface of the substrate;
the transfer layer including a peeling layer and a protective layer, layered in this order from the substrate;
the protective layer including an acrylic polyol resin having a glass transition temperature (Tg) of more than 80° C., and the acrylic polyol resin having a hydroxyl value in a range of not less than 10 mg KOH/g and not more than 100 mg KOH/g; and
the peeling layer including at least one selected from a group consisting of polyester resins, acrylic urethane resins, and epoxy resins.

5. A protective layer transfer sheet comprising:
a substrate and a transfer layer peelably provided on a surface of the substrate;
the transfer layer including a peeling layer and a protective layer, layered in this order from the substrate;
the protective layer including a polyester polyurethane resin having a glass transition temperature (Tg) of not less than 50° C., and further a polyvinyl alcohol resin having a saponification degree of not less than 80% and a number average molecular weight (Mn) of not less than 300 and not more than 100, the polyvinyl alcohol resin being in an amount of not less than 5% by weight and not more than 50% by weight, on the basis of the total solid content of the protective layer; and
the peeling layer including at least one selected from a group consisting of polyester resins, acrylic urethane resins, and epoxy resins.

6. The protective layer transfer sheet as set forth in claim 5, wherein the protective layer comprises the polyester polyurethane resin, and further a filler having a particle diameter of not more than 200 nm, the filler being in an amount of not less than 5% by weight and not more than 30% by weight, on the basis of the total solid content of the protective layer.

7. A protective layer transfer sheet comprising:
a substrate and a protective layer peelably provided on a surface of the substrate;
the protective layer including an acrylic polyol resin having a glass transition temperature (Tg) of more than 80° C., and having a weight average molecular weight (Mw) in a range of not less than 8000 and not more than 70000.

8. A protective layer transfer sheet comprising:
a substrate and a protective layer peelably provided on a surface of the substrate;
the protective layer including an acrylic polyol resin having a glass transition temperature (Tg) of more than 80° C. and having a hydroxyl value in a range of not less than 10 mg KOH/g and not more than 100 mg KOH/g.

9. A protective layer transfer sheet comprising:
a substrate and a protective layer peelably provided on a surface of the substrate;
the protective layer including an polyester polyurethane resin having a glass transition temperature (T) of not less than 50° C., and further a polyvinyl alcohol resin having a saponification degree of not less than 80% and a number average molecular weight (Mn) of not less than 300 and not more than 100, the polyvinyl alcohol resin being in an amount of not less than 5% by weight and not more than 50% by weight, on the basis of the total solid content of the protective layer.

10. The protective layer transfer sheet as set forth in claim 9, wherein the protective layer comprises the polyester polyurethane resin, and further a filler having a particle diameter of not more than 200 nm, the filler being in an amount of not less than 5% by weight and not more than 30% by weight, on the basis of the total solid content of the protective layer.

11. A protective layer transfer sheet comprising:
a substrate and a transfer layer peelably provided on a surface of the substrate;
the transfer layer including a peeling layer and a protective layer, layered in this order from the substrate;
the peeling layer including at least one selected from a group consisting of polyester resins, acrylic urethane resins, and epoxy resins, and
the protective layer including an acrylic polyol resin having a glass transition temperature (Tg) of not less than 50° C.

12. The protective layer transfer sheet according to claim 11, wherein the acrylic polyol resin has a weight average molecular weight (Mw) in a range of not less than 8000 and not more than 70000.

13. The protective layer transfer sheet according to claim 11, wherein the acrylic polyol resin is a cured acrylic polyol resin in which the acrylic polyol resin is cured by a curing agent.

14. The protective layer transfer sheet according to claim 13, wherein the curing agent is an isocyanate type curing agent selected from a group consisting of XDI type, HMDI type and IPDI type.

15. The protective layer transfer sheet according to claim 11, wherein the acrylic polyol resin has a hydroxyl value in a range of not less than 10 mg KOH/g and not more than 100 mg KOH/g.

16. An intermediate transfer medium comprising:
a substrate, and a transfer layer peelably provided on a surface of the substrate;
the transfer layer including a peeling layer, a protective layer, and a receiving layer, layered in this order from the substrate;
the peeling layer including at least one selected from a group consisting of polyester resins, acrylic urethane resins, and epoxy resins, and
the protective layer including an acrylic polyol resin having a glass transition temperature (Tg) of not less than 50° C.

* * * * *